(12) United States Patent
Van Der Velde et al.

(10) Patent No.: US 11,743,244 B2
(45) Date of Patent: *Aug. 29, 2023

(54) SIGNALING IN DUAL CONNECTIVITY MOBILE COMMUNICATION NETWORKS

(71) Applicant: Samsung Electronics Co., Ltd., Suwon-si (KR)

(72) Inventors: Himke Van Der Velde, Zwolle (NL); Gert Jan Van Lieshout, Apeldoorn (NL); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

This patent is subject to a terminal disclaimer.

(21) Appl. No.: 17/323,404

(22) Filed: May 18, 2021

(65) Prior Publication Data

US 2021/0281552 A1    Sep. 9, 2021

Related U.S. Application Data

(63) Continuation of application No. 15/501,344, filed as application No. PCT/KR2015/008071 on Jul. 31, 2015, now Pat. No. 11,038,859.

(30) Foreign Application Priority Data

Aug. 4, 2014   (GB) ..................................... 1413798

(51) Int. Cl.
*H04W 72/04* (2023.01)
*H04L 9/40* (2022.01)
(Continued)

(52) U.S. Cl.
CPC .......... *H04L 63/06* (2013.01); *H04L 41/0816* (2013.01); *H04W 12/041* (2021.01); (Continued)

(58) Field of Classification Search
CPC .. H04L 63/06; H04L 41/0816; H04W 12/041; H04W 12/043; H04W 36/0055;
(Continued)

(56) References Cited

U.S. PATENT DOCUMENTS 10,116,685 B2   10/2018 Basu Mallick et al.
2009/0046656 A1  2/2009 Kitazoe et al.
(Continued)

FOREIGN PATENT DOCUMENTS

CN    103313292 A    9/2013
CN    103747442 A    4/2014
(Continued)

OTHER PUBLICATIONS

NTT Docomo, Inc. R2-141857 Introduction of Dual Connectivity, 3GPP TSG-RAN WG2 #85bis, Valencia, Spain, Mar. 31-Apr. 4, 2014 (Year: 2014).*

(Continued)

*Primary Examiner* — Mahbubal Bar Chowdhury
(74) *Attorney, Agent, or Firm* — Jefferson IP Law, LLP

(57) ABSTRACT

There is disclosed a method of a User Equipment, UE, in a 3rd Generation Partnership Project, 3GPP, compliant mobile communications network supporting dual connectivity, and a corresponding UE. The method comprises detecting a signalled reconfiguration procedure of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB. If a DRB reconfiguration procedure type including one or more of: a handover; an SCG change; and DRB type change; is detected, the method further comprises: deciding one or (Continued)

more required layer 2 DRB-related actions resulting from the DRB reconfiguration based on: the initial DRB configuration; the final DRB configuration; and relevant DRB reconfiguration procedure types; and performing said decided layer 2 DRB-related actions.

8 Claims, 11 Drawing Sheets

(51) Int. Cl.
<table>
<tr><td>H04W 76/15</td><td>(2018.01)</td></tr>
<tr><td>H04W 36/00</td><td>(2009.01)</td></tr>
<tr><td>H04W 12/041</td><td>(2021.01)</td></tr>
<tr><td>H04W 12/043</td><td>(2021.01)</td></tr>
<tr><td>H04L 41/0816</td><td>(2022.01)</td></tr>
<tr><td>H04W 76/22</td><td>(2018.01)</td></tr>
<tr><td>H04W 88/10</td><td>(2009.01)</td></tr>
<tr><td>H04W 88/06</td><td>(2009.01)</td></tr>
<tr><td>H04W 88/08</td><td>(2009.01)</td></tr>
</table>

(52) U.S. Cl.
CPC ..... *H04W 12/043* (2021.01); *H04W 36/0055* (2013.01); *H04W 36/0069* (2018.08); *H04W 36/0079* (2018.08); *H04W 76/15* (2018.02); *H04W 76/22* (2018.02); *H04W 88/06* (2013.01); *H04W 88/08* (2013.01); *H04W 88/10* (2013.01)

(58) Field of Classification Search
CPC ......... H04W 36/0069; H04W 36/0079; H04W 76/15; H04W 76/22; H04W 88/06; H04W 88/08; H04W 88/10; H04W 92/20
See application file for complete search history.

(56) References Cited

U.S. PATENT DOCUMENTS

<table>
<tr><td>2014/0247759 A1</td><td>9/2014</td><td>Zhang et al.</td><td></td></tr>
<tr><td>2014/0308921 A1</td><td>10/2014</td><td>Zhang</td><td></td></tr>
<tr><td>2015/0092750 A1</td><td>4/2015</td><td>Huang et al.</td><td></td></tr>
<tr><td>2015/0208235 A1</td><td>7/2015</td><td>Ingale et al.</td><td></td></tr>
<tr><td>2015/0215826 A1</td><td>7/2015</td><td>Yamada</td><td></td></tr>
<tr><td>2015/0215965 A1</td><td>7/2015</td><td>Yamada</td><td></td></tr>
<tr><td>2015/0264562 A1*</td><td>9/2015</td><td>Wu ..................... H04W 12/037</td><td>380/270</td></tr>
<tr><td>2015/0282239 A1</td><td>10/2015</td><td>Han et al.</td><td></td></tr>
<tr><td>2015/0327130 A1</td><td>11/2015</td><td>Park et al.</td><td></td></tr>
<tr><td>2016/0029213 A1</td><td>1/2016</td><td>Rajadurai et al.</td><td></td></tr>
<tr><td>2016/0249210 A1</td><td>8/2016</td><td>Chang et al.</td><td></td></tr>
<tr><td>2016/0309375 A1</td><td>10/2016</td><td>Dai et al.</td><td></td></tr>
<tr><td>2016/0337925 A1</td><td>11/2016</td><td>Fujishiro et al.</td><td></td></tr>
<tr><td>2016/0366175 A1</td><td>12/2016</td><td>Basu Mallick et al.</td><td></td></tr>
<tr><td>2016/0373975 A1</td><td>12/2016</td><td>Xu et al.</td><td></td></tr>
<tr><td>2017/0311212 A1</td><td>10/2017</td><td>Yamada</td><td></td></tr>
<tr><td>2019/0281521 A1</td><td>9/2019</td><td>Zhang et al.</td><td></td></tr>
</table>

FOREIGN PATENT DOCUMENTS

<table>
<tr><td>CN</td><td>103959829 A</td><td>7/2014</td></tr>
<tr><td>EP</td><td>3 057 349 A1</td><td>8/2016</td></tr>
<tr><td>JP</td><td>2015-186049 A</td><td>10/2015</td></tr>
<tr><td>WO</td><td>2008-157717 A1</td><td>12/2008</td></tr>
<tr><td>WO</td><td>2013/097672 A1</td><td>7/2013</td></tr>
<tr><td>WO</td><td>2014/056130 A1</td><td>4/2014</td></tr>
<tr><td>WO</td><td>2014/113082 A1</td><td>7/2014</td></tr>
<tr><td>WO</td><td>2014/113190 A1</td><td>7/2014</td></tr>
<tr><td>WO</td><td>2014-182131 A1</td><td>11/2014</td></tr>
<tr><td>WO</td><td>2015/062097 A1</td><td>5/2015</td></tr>
</table>

OTHER PUBLICATIONS

Huawei R3-140117 MeNB Mobility Procedure, 3GPP TSG-RAN WG3 Meeting #83, Prague, Czech Republic, Feb. 10-14, 2014 (Year: 2014).*
Fujitsu R3-140093 Scenarios and prioritizations for dual connectivity, 3GPP TSG-RAN WG3 Meeting #83, Feb. 10-14, 2013 (Year: 2013).*
Samsung; Report on [85#21][LTE/DC] Basic signalling flows (Samsung); 3GPP TSG-RAN2#85 bis meeting; Tdoc R2-141465; Mar. 31-Apr. 4, 2014; Valencia, Spain.
Intel Corporation; RRC signalling for SCG release; 3GPP TSG-RAN WG2 Meeting #85bis; R2-141175; Mar. 31-Apr. 4, 2014; Valencia, Spain.
Intel Corporation; SCG release handling; 3GPP TSG-RAN WG2 #86; R2-142029; May 19-23, 2014; Seoul, Korea.
Korean Decision to Grant with English translation dated Jul. 26, 2021; Korean Appln. No. 10-2017-7006123.
Extended European Search Report dated Aug. 31, 2021; European Appln. No. 21174501.3-1231.
Media Tek Inc.; "'Signaling Procedure for Dual connectivity'," 3GPP TSG RAN2 #85; Jan. 30, 2014; R2-140196.
Intel Corporation; "Detailed signaling procedure for dual connectivity"; 3GPP TSG RAN2 #84; Nov. 2, 2013; R2-134266.
3GPP, TSG RAN; "Study on Small Cell enhancement for E-TURA and E-UTRAN; Higher layer aspects"; Jan. 7, 2014; 3GPP TR 36.842 V12.0.0; (Release 12).
Kyocera; "Reselection enhancement for dual connectivity initiation"; 3GPP TSG RAN WG2 #86; May 10, 2014; R2-142236.
Chinese Office Action with English translation dated Sep. 2, 2019; Chinese Appln. No. 201580054131.0.
Samsung; Dual Connectivity RRC PDU specification, miscellaneous issues; 3GPP TSG-RAN2#86 meeting; Tdoc R2-142534; May 19-23, 2014; Seoul, South Korea.
Chinese Office Action with English translation dated Sep. 7, 2020; Chinese Appln. No. 201580054131.0.
Ericsson; RRC reconfiguration procedures for dual connectivity; 3GPP TSG-RAN WG2 #86; Tdoc R2-142412; May 19-23, 2014; Seoul, South Korea.
Korean Office Action dated Jan. 18, 2021; Korean Appln. No. 10-2017-7006123.
Nsn et al.; SCG mobility procedures; 3GPP TSG-RAN WG3 Meeting #83bis; R3-140612; Mar. 31-Apr. 4, 2014; San Jose del Cabo, Mexico.
Huawei; SeNB Change and Data Forwarding; 3GPP TSG-RAN WG3 Meeting #83bis; R3-140568; Mar. 31-Apr. 4, 2014; San Jose del Cabo, Mexico.
KT Corp.; PDCP status report for split bearer; 3GPP TSG-RAN WG2 Meeting #86; R2-142160; May 19-23, 2014; Seoul, South Korea.
Fujitsu; L2 handling for SeNB related procedures; 3GPP TSG-RAN WG2 Meeting #86; R2-142334; May 19-23, 2014; Seoul, South Korea.
European Search Report dated Jan. 22, 2021; European Appln. No. 15 829 237.5-1231.

* cited by examiner

SIGNALING IN DUAL CONNECTIVITY MOBILE COMMUNICATION NETWORKS

CROSS-REFERENCE TO RELATED APPLICATION(S)

This application is a continuation application of prior application Ser. No. 15/501,344, filed on Feb. 2, 2017, which is a U.S. National Stage application under 35 U.S.C. § 371 of an International application filed on Jul. 31, 2015 and assigned application number PCT/KR2015/008071, which claimed the benefit of a Great Britain patent application filed on Aug. 4, 2014 in the Great Britain Intellectual Property Office and assigned Serial number 1413798.8, the entire disclosure of which is hereby incorporated by reference.

TECHNICAL FIELD

The present application relates to inventions in signalling in dual connectivity mobile communication networks. In particular, in certain embodiments there are provided methods of a User Equipment, UE, and a related UE, for detecting a signalled configuration or reconfiguration procedure of a Data Radio Bearer in a 3rd Generation Partnership Project, 3GPP, compliant mobile communications network supporting dual connectivity, and for deciding one or more resulting required layer 2 DRB-related actions. In embodiments, the invention provides a signalling methods on DRB reconfiguration or DRB type change not including handover. Further, in embodiments, the present invention provides methods of autonomous reconfiguration by a UE on detection of Radio Link Failure, RLF, of an SCG DRB or an SCG release.

BACKGROUND ART

Wireless or mobile (cellular) communications networks in which a mobile terminal (UE, such as a mobile handset) communicates via a radio link to a network of base stations (e.g. eNBs) or other wireless access points connected to a telecommunications network, have undergone rapid development through a number of generations. The initial deployment of systems using analogue signalling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardise technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and LTE concerning the air interface. The first set of EPS specifications were released as 3GPP Release 8 in December 2008. LTE uses an improved radio access technology known as Evolved UTRA (E-UTRA), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

The present invention may be implemented within an LTE mobile network. Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signalling is represented by dashed lines.

The E-UTRAN 104 comprises a single type of component: an eNB (E-UTRAN Node B) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE has normally only communicated with one eNB through one cell at a time. However, as will be explained below, dual connectivity (DC) is being introduced such that the UE may communicate with more than one eNB at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

Within an LTE network, data is transferred between different components of the network using bearers. An EPS bearer serves to transfer data between a UE and a P-GW. The data flow is bi-directional. Data carried by an EPS bearer comprises one or more service data flows carrying data for a particular service, for instance streamed media. Each service data flow comprises one or more packet flows.

3GPP Radio Access Network (RAN) workgroups are current working on a Study Item (SI) called "Small Cell Enhancements". The technical outcome of this SI is documented in 3GPP TR 36.842 "Evolved Universal Terrestrial Radio Access (E-UTRA)"; Study on Small Cell enhancements for E-UTRA and E-UTRAN—Higher layer aspects (Release 12); c0.0. 3GPP TR 36.842 concerns the radio access aspects of the SI and impacts upon both the UE and the eNB. Small cell enhancements are applicable, for instance, where there is a macro cell and a small cell (within the coverage area of the macro cell) operating on the same carrier frequency.

It is currently proposed that the RAN will support so called "dual connectivity" functionality. Dual connectivity refers to an operation where a given UE consumes radio resources provided by at least two different network points (Master and Secondary eNBs) connected with non-ideal backhaul while the UE is active within the network (in an RRC CONNECTED (Radio Resource Control Connected) state. This is illustrated in FIG. 2. In dual connectivity, the UE is configured with multiple cells, one per serving frequency, while the serving cells are connected to more than one eNB. This is also referred to as inter-eNB Carrier Aggregation (CA). Dual connectivity permits a greater data rate to be achieved between the UE and the RAN. To achieve dual connectivity, it is proposed that the RAN will support "bearer split" functionality. In dual connectivity, bearer split refers to the ability to split a bearer over multiple eNBs. A Master eNB (MeNB, usually the macro cell eNB) is the eNB which terminates at least S1-MME interface (the interface between the eNB and the MME) and therefore act as mobility anchor towards the Core Network (CN). A Secondary eNB (SeNB, usually the eNB handling small cells) is an eNB providing additional radio resources for the UE, which is not the MeNB. A Master Cell Group (MCG) is the group of serving cells providing radio resources associated with the MeNB, whereas a Secondary Cell Group (SCG) is the group of serving cells providing radio resources associated with the SeNB.

Referring to FIG. 3A, this shows option 1 of FIG. 8.1.1-1 of TS 36.842, which illustrates one now-supported bearer split option in the downlink direction (bearer splitting is currently not being supported in the uplink direction). It can be seen that there is a first EPS bearer (#1: solid arrows) communicating directly from a P-GW (not shown) via the S-GW and the MeNB to the UE. A second EPS bearer (#2: dashed arrows) passes from the S-GW and on to the UE via the SeNB (and not via the MeNB). Here the Core Network (specifically the S-GW) routes the data across one of the two bearers.

FIG. 3B, this shows option 3 of FIG. 8.1.1-1 of TS 36.842, which illustrates another now-supported bearer split option, taking the downlink direction as an example. It can be seen that there is a first EPS bearer (#1: solid arrows) communicating directly from a P-GW (not shown) via the S-GW and the MeNB to the UE. A second EPS bearer (#2: dashed arrows) passes from the MeNB to the UE via the SeNB as well as directly between the MeNB and the UE. The second EPS bearer is split across the RAN, and the RAN itself (specifically the MeBN) splits the data between the bearers.

In these user plane architectures, an MCG Data Radio Bearer (DRB) is the term used for a DRB which DL data is transferred via MCG cells, likewise an SCG DRB is a DRB which DL data is transferred via SCG cells while a split DRB is used to refer to a DRB which DL data is transferred via both MCG and SCG. In uplink there is no dual connectivity i.e. for a split DRB, the MeNB configures/indicates which Cell Group (CG) the UE shall use to transfer UL data.

The control plane architecture adopted to provide dual connectivity is shown in FIG. 4. Here, only the MeNB generates the final Radio Resource Control (RRC) messages to be sent towards the UE after the coordination of Radio Resource Management (RRM) functions between MeNB and SeNB. The MeNB may forward configuration information controlled by the SeNB. The UE RRC entity sees all messages coming only from one entity (in the MeNB) and the UE only replies back to that entity. I.e. for RRC signalling there is no Dual Connectivity (DC) i.e. the MeNB handles all signalling towards the UE. In general the SeNB decides the SCG related configuration parameters and these are transferred via the MeNB to the UE via MCG cells.

To achieve a split bearer it is necessary to modify the existing user plane architecture shown in FIG. 6-1 of 3GPP TS 36.300 "Evolved Universal Terrestrial Radio Access (E-UTRA) and Evolved Universal Terrestrial Radio Access Network (E-UTRAN)"; Overall description; Stage 2 (Release 11); v11.7.0 (not reproduced in the present specification). At an eNB, for communicating with the UE across the air interface, the eNB comprises a protocol stack having a PDCP layer, a Radio Link Control (RLC) layer and a Medium Access Control (MAC) layer. Collectively, these protocol layers form the data link layer: layer two of the standard Open Systems Interconnection (OSI) model. The MAC layer carries out low-level control of the physical layer (layer 1 of the OSI model, and outside of the scope of the present specification), including scheduling data transmissions between the mobile and the base station. The RLC layer maintains the data link between the UE and the eNB, and handles the acknowledgement of receipt of data packets, when required. The PDCP layer carries out higher-level transport functions including header compression and security. At each layer of the protocol stack the protocol receives a data packet from the protocol above in the form of a Service Data Unit (SDU), processes the packets and adds a header to form a Protocol Data Unit (PDU). The PDU becomes the incoming SDU of the next layer down the stack.

In a bearer architecture such as is shown in FIG. 3A the layer 2 protocol stack at the eNB is split between the MeNB and the SeNB, as is shown in FIG. 5A. Specifically, a split radio bearer uses two RLC entities as shown in FIG. 5B, which reproduces FIG. 8.1.1.8-1 from 3GPP TR 36.842. FIG. 5B shows a first non-split bearer protocol stack at the MeNB (solid boxes). FIG. 5B shows data being received from the S-GW across the S1 interface. FIG. 5B further shows a second split radio bearer (dashed boxes and dashed arrows). For the split bearer there is a single PDCP entity at the MeNB and duplicated RLC/MAC protocol stack entities for the split bearer in both the MeNB and the SeNB. Data is sent between the single PDCP entity in the MeNB and the RCL/MAC entities in the SeNB across the Xn interface (alternatively referred to as the X2 interface). Although not shown in FIG. 3A, at the UE side there would be corresponding MAC/RLC/PDCP entities, and specifically a single UE PDCP entity and duplicated UE MAC/RLC entities. Although not shown in FIG. 5A, at the UE side there would be corresponding MAC/RLC/PDCP entities for the bearers.

In a bearer split architecture such as is shown in FIG. 3B the layer 2 protocol stack at the eNB is split between the MeNB and the SeNB, as is shown in FIG. 5B. Specifically, a split radio bearer uses two RLC entities as shown in FIG. 5B, which reproduces FIG. 8.1.1.8-1 from 3GPP TR 36.842. FIG. 5B shows a first non-split bearer protocol stack at the MeNB (solid boxes). FIG. 5B shows data being received from the S-GW across the S1 interface. FIG. 5B further shows a second split radio bearer (dashed boxes and dashed arrows). For the split bearer there is a single PDCP entity at the MeNB and duplicated RLC/MAC protocol stack entities for the split bearer in both the MeNB and the SeNB. Data is sent between the single PDCP entity in the MeNB and the RCL/MAC entities in the SeNB across the Xn interface (alternatively referred to as the X2 interface). Although not shown in FIG. 5B, at the UE side there would be corresponding MAC/RLC/PDCP entities, and specifically a single UE PDCP entity and duplicated UE MAC/RLC entities.

DISCLOSURE OF INVENTION

Technical Problem

The RAN and the UE must be configured to communicate through signalling and to cooperate in order to efficiently and effectively configure the UE, RAN and CN for DC, and to avoid UE downtime, high latency, and increased signalling volume. This signalling and configuration must take into account the numerous DRB reconfiguration procedure types and DRB type changes that can occur during DC. That is, the DRB reconfiguration procedures can include: a normal reconfiguration change; an SCG change; an SCG release; and an SCG establishment procedure. The SCG change and SCG release procedures can occur as part of a handover (HO) procedure. In addition, Radio Link Failure (RLF) of the DRB in DC, including an SCG DRB can occur. The DRB type can be changed between an MCG DRB, an SCG DRB and a split DRB.

Solution to Problem

Viewed from one aspect, an invention of the present disclosure provides a method of a User Equipment, UE, in a 3rd Generation Partnership Project, 3GPP, compliant mobile communications network supporting dual connectivity, the method comprising: detecting a signalled reconfiguration procedure of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and if a DRB reconfiguration procedure type including one or more of: a handover; an SCG change; and DRB type change; is detected: deciding one or more required layer 2 DRB-related actions resulting from the DRB reconfiguration based on: the initial DRB configuration; the final DRB configuration; and relevant DRB reconfiguration procedure types; and performing said decided layer 2 DRB-related actions.

Optionally, if when deciding one or more required layer 2 DRB-related actions resulting from the DRB reconfiguration, multiple triggers for an action are generated, the method further comprises performing the action only once.

Optionally, when the required layer 2 DRB-related actions include a Packet Data Convergence Protocol, PDCP, re-establishment action, if when deciding one or more required actions resulting from the DRB reconfiguration, multiple triggers for the same PDCP re-establishment action are generated, the method further comprises performing the PDCP re-establishment action only once.

Optionally, if the mobile communications network supports delta signalling on SCG change or DRB type change not including handover and reconfiguration signalling an SCG change procedure or DRB type change not including handover is detected, the method further comprises applying received signalled changes compared to the current SCG configuration parameters to update the stored SCG parameters.

Optionally, the method further comprises: flushing the layer 2 of Service Data Units, SDUs; resetting/releasing and adding the SCG-MAC entity; re-establishing/releasing and adding the SCG-RLC entity; and continuing and re-establishing the PDCP entity for the SCG DRB that is established.

Optionally, wherein the mobilityControlInfoSCG field of the DRB reconfiguration message indicates an SCG change procedure.

Optionally, if the mobile communications network supports delta signalling on SCG change or DRB type change not including handover and reconfiguration signalling release and addition of an SCG change is detected and full SCG configuration signalling is received upon an SCG change procedure or DRB type change not including handover, the method further comprises: continuing and re-establishing the PDCP entity for the SCG DRB that is established; determining, from the signalled full SCG configuration, the changes to the current PDCP configuration necessary to reconfigure the PDCP; and applying the determined changes.

Optionally, wherein the fullConfigSCG field of the DRB reconfiguration message indicates that delta signalling should not be used.

Optionally, if reconfiguration is detected including: a reconfiguration procedure type not including handover for DRBs in which the DRB type changes between (a) a split DRB or an MCG DRB in which DL data is received only from a MeNB of a MCG; and (b) an SCG DRB; or an SCG change procedure for an SCG DRB; the method further comprises re-establishing the PDCP entity for the concerned DRB (i.e. the PDCP entity is re-established a) for the DRB for which the indicated type change is performed/b) for the indicated DRB type upon SCG change).

Optionally, if reconfiguration is detected including: a reconfiguration procedure type not including handover for DRBs in which the DRB type changes from a split DRB to an MCG DRB in which DL data is received only from serving cells of a MCG; or an SCG change procedure for a split DRB; the method further comprises partially re-establishing the PDCP entity for the concerned DRB (i.e. the PDCP entity is re-established a) for the DRB for which the indicated type change is performed/b) for the indicated DRB type upon SCG change).

Optionally, if reconfiguration including: a reconfiguration procedure type not including handover for DRBs in which the DRB type changes from a split DRB to an MCG DRB in which DL data is received only from serving cells of a MCG; or an SCG change procedure for a split DRB; occurs and signalling indicating handover procedures is received; the method further comprises performing the procedures indicated for handover.

Optionally the received signalling of the DRB configuration includes SCG configuration parameters provided together in a single information structure comprising two parts: a first part including SCG configuration parameters generated by the MeNB; and a second part including SCG configuration parameters generated by the SeNB.

Optionally a container is provided around the parameters of the first and second parts. Alternatively a container is provided around only the parameters of the second part.

Optionally the container is an octet string.

Optionally, the method further comprises: detecting SCG Radio Link Failure, SCG-RLF, or DRB reconfiguration including an SCG release procedure; and if SCG-RLF or an SCG release procedure is detected: initiating autonomous reconfiguration of the DRB.

Optionally, when SCG RLF or SCG release of a split DRB is detected, initiating autonomous reconfiguration of the DRB comprises: reconfiguring the split DRB to an MCG DRB type by releasing the associated SCG-RLC entity and associated logical channel.

Optionally, when SCG RLF or SCG release of a SCG DRB is detected, initiating autonomous reconfiguration of the DRB comprises: reconfiguring the SCG DRB to an MCG DRB type by releasing the associated SCG-RLC entity and associated logical channel, adding a new MCG-RLC entity with a default configuration, re-establishing the PDCP entity and reconfiguring the PDCP entity to a default configuration.

Optionally, the method further comprises receiving an indication, in advance of SCG-RLF or SCG release, from the MeNB, as to what default configuration is to be applied following autonomous reconfiguration.

Optionally, if the default configuration is indicated as that used in the SCG prior to SCG-RLF or SCG release and if a further indication to release configuration parameter extensions beyond a certain protocol release is received, the method further comprises releasing configuration parameter extensions beyond the indicated protocol release.

Optionally the mobile communications network is a Long Term Evolution, LTE, compliant mobile communications network supporting dual connectivity.

Viewed from another aspect, an invention of the present disclosure provides User Equipment, UE, in a 3rd Generation Partnership Project, 3GPP, compliant mobile communications network supporting dual connectivity, wherein the UE is arranged to: detect a signalled reconfiguration procedure of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and if a DRB reconfiguration procedure type including one or more of: a handover; an SCG change; and DRB type change; is detected: decide one or more required layer 2 DRB-related actions resulting from the DRB reconfiguration based on: the initial DRB configuration; the final DRB configuration; and relevant DRB reconfiguration procedure types; and perform said decided layer 2 DRB-related actions.

Optionally, the UE is further arranged to implement the above-described optional aspects of the related method.

Viewed from one aspect, an invention of the present disclosure provides a method of a User Equipment, UE, in a 3rd Generation Partnership Project, 3GPP, compliant mobile communications network supporting dual connectivity, the method comprising:

detecting a signalled reconfiguration procedure of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and if the mobile communications network supports delta signalling on SCG change or DRB type change not including handover and reconfiguration signalling an SCG change procedure or DRB type change not including handover is detected, the method further comprising applying received signalled changes compared to the current SCG configuration parameters to update the stored SCG parameters.

Optionally, the method further comprises: flushing the layer 2 of Service Data Units, SDUs; resetting/releasing and adding the SCG-MAC entity; re-establishing/releasing and adding the SCG-RLC entity; and continuing and re-establishing the PDCP entity for the SCG DRB that is established.

Optionally, the mobilityControlInfoSCG field of the DRB reconfiguration message indicates an SCG change procedure Optionally, if the mobile communications network supports delta signalling on SCG change or DRB type change not including handover and reconfiguration signalling release and addition of an SCG change is detected and full SCG configuration signalling is received upon an SCG change procedure or DRB type change not including handover, the method further comprises: continuing and re-establishing the PDCP entity for the SCG DRB that is established; determining, from the signalled full SCG configuration, the changes to the current PDCP configuration necessary to reconfigure the PDCP; and applying the determined changes. Optionally the fullConfigSCG field of the DRB reconfiguration message indicates that delta signalling should not be used.

Viewed from another aspect, an invention of the present disclosure provides User Equipment, UE, in a 3rd Generation Partnership Project, 3GPP, compliant mobile communications network supporting dual connectivity, wherein the UE is arranged to:

detecting a signalled reconfiguration procedure of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and if the mobile communications network supports delta signalling on SCG change or DRB type change not including handover and reconfiguration signalling an SCG change procedure or DRB type change not including handover is detected, the method further comprising applying received signalled changes compared to the current SCG configuration parameters to update the stored SCG parameters.

Viewed from another aspect, the an invention of the present disclosure provides a method of an eNB, in a 3rd Generation Partnership Project, 3GPP, compliant mobile communications network supporting dual connectivity, the method comprising:

transmitting signalling of a reconfiguration procedure of a Data Radio Bearer, DRB, having or changing to a DRB type in which downlink, DL, data is transmitted from only serving cells of a Secondary Cell Group, SCG, connected to a Secondary eNB, SeNB, via an SCG DRB, or in which DL data is transmitted from a SCG and also from serving cells of a Master Cell Group, MCG, connected to a Master eNB, MeNB, via a split DRB; and if the eNB and target SeNB supports delta signalling on SCG change or DRB type change not including handover and the reconfiguration includes an SCG change procedure or DRB type change not including handover, the method further comprises:

signalling an SCG change procedure or DRB type change not including handover; and signalling changes compared to the current SCG configuration parameters.

Optionally, if the eNB and target SeNB do not support delta signalling on SCG change or DRB type change not including handover and the reconfiguration includes an SCG change procedure or DRB type change not including handover, the method further comprises signalling a full SCG configuration and an indication that an existing SCG configuration should be released before applying the signalled SCG configuration.

Optionally, the eNB is the MeNB.

Optionally, the fullConfigSCG field is used to indicate for the UE to release the entire SCG configuration before applying a signalled SCG configuration. Optionally, the indication for the UE to release the entire SCG configuration before applying a signalled SCG configuration is received from and/or generated by an SeNB.

Optionally, transmitting an indication for the UE to perform the operations defined for SCG change comprises using the mobilityControlInfoSCG field of the DRB.

Optionally, the method further comprises transmitting to a target SeNB the SCG configuration upon inter-SeNB SCG change. Optionally, the method further comprises transmitting to a target MeNB the SCG configuration upon inter-MeNB handover.

Viewed from another aspect, an invention of the present disclosure provides a method of a User Equipment, UE, in a 3rd Generation Partnership Project, 3GPP, compliant mobile communications network supporting dual connectivity, the method comprising:

detecting reconfiguration of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and if reconfiguration is detected including:

a reconfiguration procedure type not including handover for DRBs in which the DRB type changes between (a) a split DRB or an MCG DRB in which DL data is received only from a MeNB of a MCG; and (b) an SCG DRB;

an SCG change procedure for an SCG DRB;

the method further comprising re-establishing the PDCP entity for the concerned DRB; and/or if reconfiguration is detected including:

a reconfiguration procedure type not including handover for DRBs in which the DRB type changes from a split DRB to an MCG DRB in which DL data is received only from serving cells of a MCG; or an SCG change procedure for a split DRB;

the method further comprising partially re-establishing the PDCP entity for the concerned DRB.

Alternatively, to avoid having to introduce a partial PDCP re-establishment procedure, the MeNB may, if reconfiguration including:

a reconfiguration procedure type not including handover for DRBs in which the DRB type changes from a split DRB to an MCG DRB in which DL data is received only from serving cells of a MCG; or an SCG change procedure for a split DRB;

occurs, the MeNB may initiate handover procedures and signal the UE appropriately (e.g. by including field mobilityControlInfo field in the RRC Connection Reconfiguration message).

Viewed from another aspect, an invention of the present disclosure provides a User Equipment, UE, in a 3rd Generation Partnership Project, 3GPP, compliant mobile communications network supporting dual connectivity, the UE being arranged to:

detect reconfiguration of a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and if reconfiguration is detected including:

a reconfiguration procedure type not including handover for DRBs in which the DRB type changes between (a) a split DRB or an MCG DRB in which DL data is received only from a MeNB of a MCG; and (b) an SCG DRB;

an SCG change procedure for an SCG DRB;

the method further comprising re-establishing the PDCP entity for the concerned DRB; and/or if reconfiguration is detected including:

a reconfiguration procedure type not including handover for DRBs in which the DRB type changes from a split DRB to an MCG DRB in which DL data is received only from serving cells of a MCG; or an SCG change procedure for a split DRB;

the method further comprising partially re-establishing the PDCP entity for the concerned DRB.

Viewed from another aspect, an invention of the present disclosure provides a method of a User Equipment, UE, in a 3rd Generation Partnership Project, 3GPP, compliant mobile communications network supporting dual connectivity, the method comprising:

in relation to a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and receiving signalling of a DRB configuration including SCG configuration parameters provided together in a single information structure comprising two parts:

a first part including SCG configuration parameters generated by the MeNB; and a second part including SCG configuration parameters generated by the SeNB.

Optionally, container is provided around the parameters of the first and second parts.

Optionally, a container is provided around only the parameters of the second part.

Optionally, the container is an octet string.

Viewed from another aspect, an invention of the present disclosure provides a User Equipment, UE, in a 3rd Generation Partnership Project, 3GPP, compliant mobile communications network supporting dual connectivity, the UE being arranged:

in relation to a Data Radio Bearer, DRB, having or changing to a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB; and receive signalling of a DRB configuration including SCG configuration parameters provided together in a single information structure comprising two parts:

a first part including SCG configuration parameters generated by the MeNB; and a second part including SCG configuration parameters generated by the SeNB.

Viewed from another aspect, the an invention of the present disclosure provides a method of an eNB, in a 3rd Generation Partnership Project, 3GPP, compliant mobile communications network supporting dual connectivity, the method comprising:

transmitting signalling of a configuration of a Data Radio Bearer, DRB, having or changing to a DRB type in which downlink, DL, data is transmitted to a User Equipment, UE, from only serving cells of a Secondary Cell Group, SCG, connected to a Secondary eNB, SeNB, via an SCG DRB, or in which DL data is transmitted from a SCG and also from serving cells of a Master Cell Group, MCG, connected to a Master eNB, MeNB, via a split DRB, the signalled DRB configuration including SCG configuration parameters provided together in a single information structure comprising two parts:

a first part including SCG configuration parameters generated by the MeNB; and a second part including SCG configuration parameters generated by the SeNB.

Optionally, the eNB is the MeNB.

Optionally, a container is provided around the parameters of the first and second parts.

Optionally, the eNB, acting as the MeNB, sets the first part of the SCG configuration parameters and receives the second part of the SCG configuration parameters from the SeNB, and transmits to the UE the SCG configuration parameters provided in a single information structure comprising the two parts.

Optionally, a container is provided around the parameters of the first and second parts. Here, the MeNB transmits the first part of the SCG configuration parameters to the SeNB, and receives from the SeNB and transparently forwards to the UE the SCG configuration parameters provided in a single information structure comprising the two parts. Alternatively, the MeNB may decode the SCG configuration parameters of the second part and recode the SCG configuration parameters of the first and second parts, placing them together in a container before transmitting the SCG configuration parameters to the UE.

Optionally, a container is provided around only the parameters of the second part. In this embodiment, the MeNB receives the second part of the SCG configuration parameters from the SeNB, and transparently forwards them to the UE, placed within a container and which together with the first part of the SCG configuration parameters is provided in a single information structure comprising the two parts.

Viewed from another aspect, the an invention of the present disclosure provides a method of an eNB, in a 3rd Generation Partnership Project, 3GPP, compliant mobile communications network supporting dual connectivity, the method comprising:

transmitting configuration parameters, for use in signalling of a configuration of a Data Radio Bearer, DRB, having or changing to a DRB type in which downlink, DL, data is transmitted to a User Equipment, UE, from only serving cells of a Secondary Cell Group, SCG, connected to a Secondary eNB, SeNB, via an SCG DRB, or in which DL data is transmitted from a SCG and also from serving cells of a Master Cell Group, MCG, connected to a Master eNB, MeNB, via a split DRB, wherein the eNB is operating as the SeNB and wherein the transmitted DRB configuration parameters comprise SCG configuration parameters generated by the SeNB.

Optionally, the DRB configuration parameters are transmitted to the MeNB over the X2 interface.

Optionally, the method further comprises, receiving SCG configuration parameters generated by the MeNB and providing the transmitted DRB configuration parameters together in a single information structure comprising two parts:

a first part including the SCG configuration parameters generated by the MeNB; and a second part including the SCG configuration parameters generated by the SeNB.

Optionally, a container is provided around only the parameters of the second part.

Optionally, a container is provided around the parameters of the first and second parts.

Viewed from one aspect, an invention of the present disclosure provides a method of a User Equipment, UE, in a 3rd Generation Partnership Project, 3GPP, compliant mobile communications network supporting dual connectivity, the method comprising:

in relation to a Data Radio Bearer, DRB, having a DRB type in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB, detecting SCG Radio Link Failure, SCG-RLF, or DRB reconfiguration including an SCG release procedure; and if SCG-RLF or an SCG release procedure is detected:
initiating autonomous reconfiguration of the DRB.

Optionally, when SCG RLF or SCG release of a split DRB is detected, initiating autonomous reconfiguration of the DRB comprises:

reconfiguring the split DRB to an MCG DRB type by releasing the associated SCG-RLC entity and associated logical channel.

Optionally, when SCG RLF or SCG release of a SCG DRB is detected, initiating autonomous reconfiguration of the DRB comprises:

reconfiguring the SCG DRB to an MCG DRB type by releasing the associated SCG-RLC entity and associated logical channel, adding a new MCG-RLC entity with a default configuration, re-establishing the PDCP entity and reconfiguring the PDCP entity to a default configuration.

Optionally, the method further comprises receiving an indication, in advance of SCG-RLF or SCG release, from the MeNB, as to what default configuration is to be applied following autonomous reconfiguration.

Optionally, if the default configuration is indicated as that used in the SCG prior to SCG-RLF or SCG release and if a further indication to release configuration parameter extensions beyond a certain protocol release is received, the method further comprises releasing configuration parameter extensions beyond the indicated protocol release.

The above aspects of the invention and optional features may be provided independently of each other or implemented together in the various possible combinations thereof, which are to be taken as being part of this disclosure.

Another aspect of the invention provides a computer program comprising instructions arranged, when executed, to implement a method and/or apparatus in accordance with any one of the above-described aspects. A further aspect provides machine-readable storage storing such a program. Optionally, the machine readable medium is non-transitory.

Advantageous Effects of Invention

The present invention provides signalling and operation methods at the UE and the RAN to effectively implement DC taking into account the DRB reconfigurations and type changes that occur in the course of using DC.

BRIEF DESCRIPTION OF DRAWINGS

Embodiments of the invention are further described hereinafter with reference to the accompanying drawings, in which.

MODE FOR THE INVENTION

Embodiments of the invention will now be described in the context of an LTE compliant mobile wireless communications network operating in accordance with the 3GPP LTE standards up to Release-12 and beyond. However, it will be understood that this is by way of example only and that other embodiments may involve other wireless networks, operating at least partially in compliance with other releases and other standards.

Figure 1:
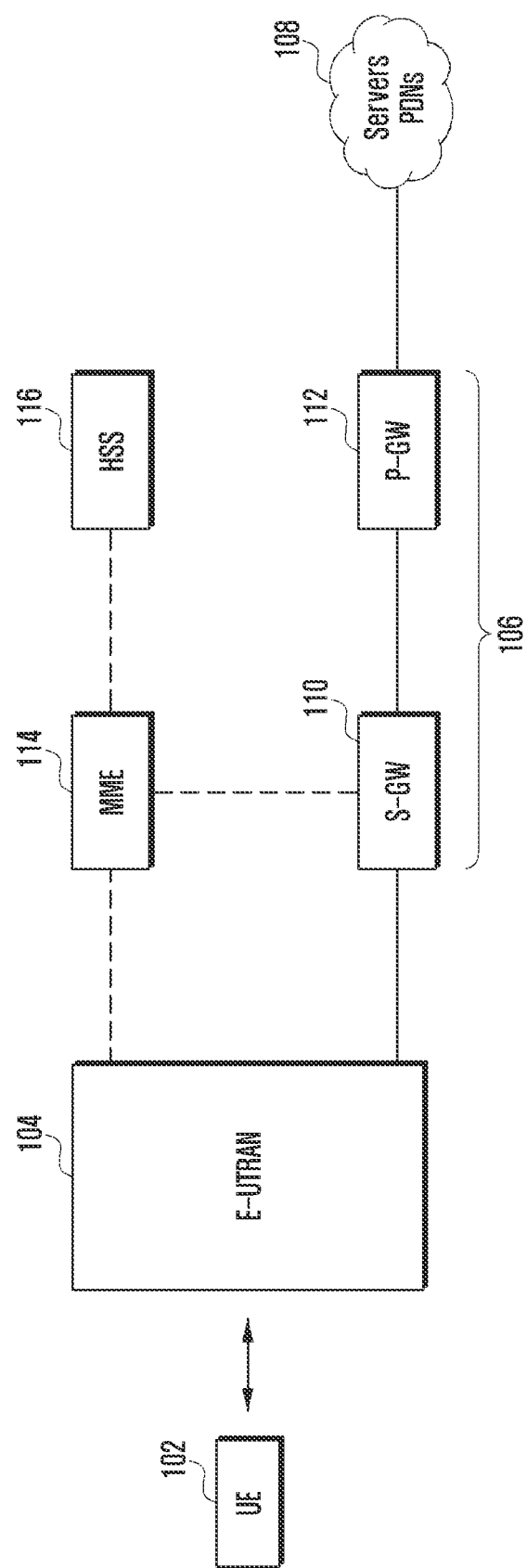
FIG. 1 schematically illustrates an overview of an LTE mobile communication network.
Figure 2:
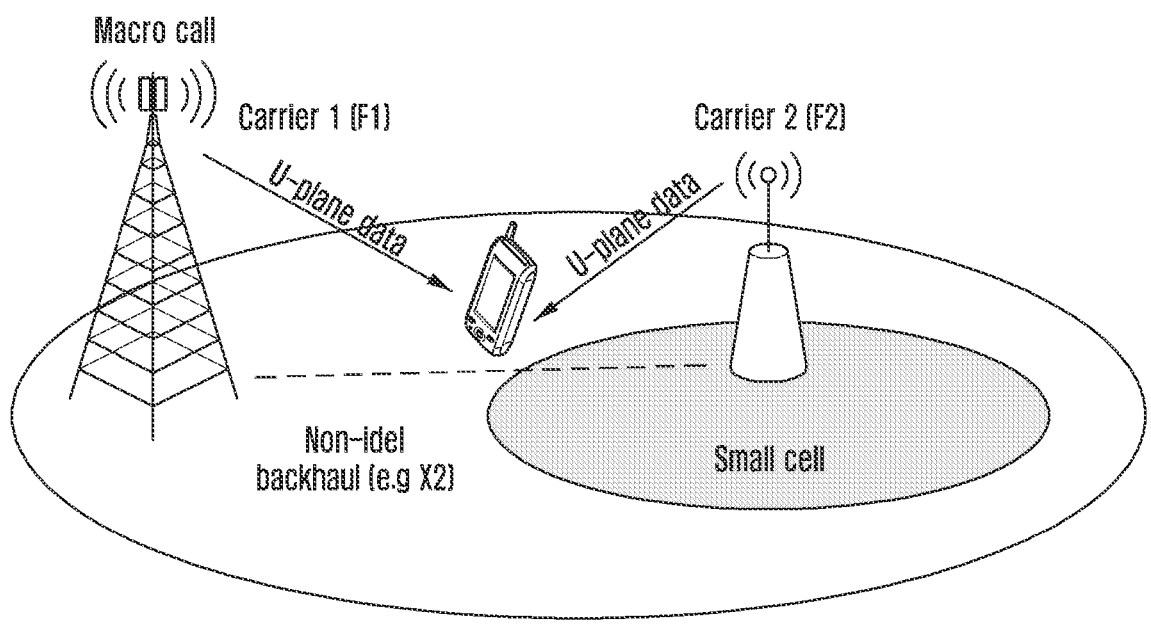
FIG. 2 illustrates inter-node radio resource allocation in dual connectivity.
Figure 3A:
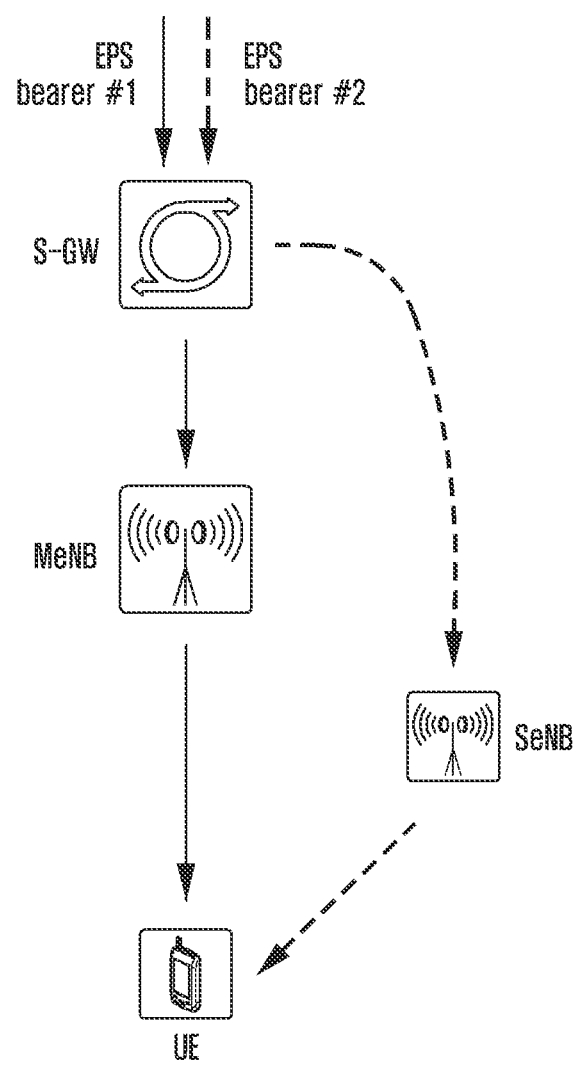
FIG. 3A illustrates a supported arrangement of a bearer for splitting user plane downlink data at the CN.
Figure 3B:
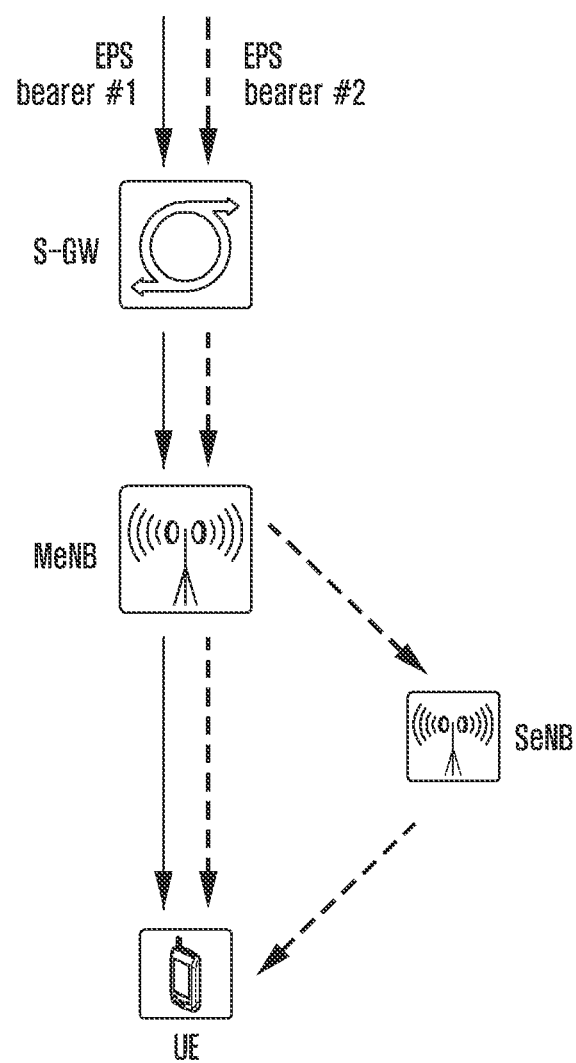
FIG. 3B illustrates another supported arrangement of a split bearer for splitting user plane downlink data at the RAN.
Figure 4:
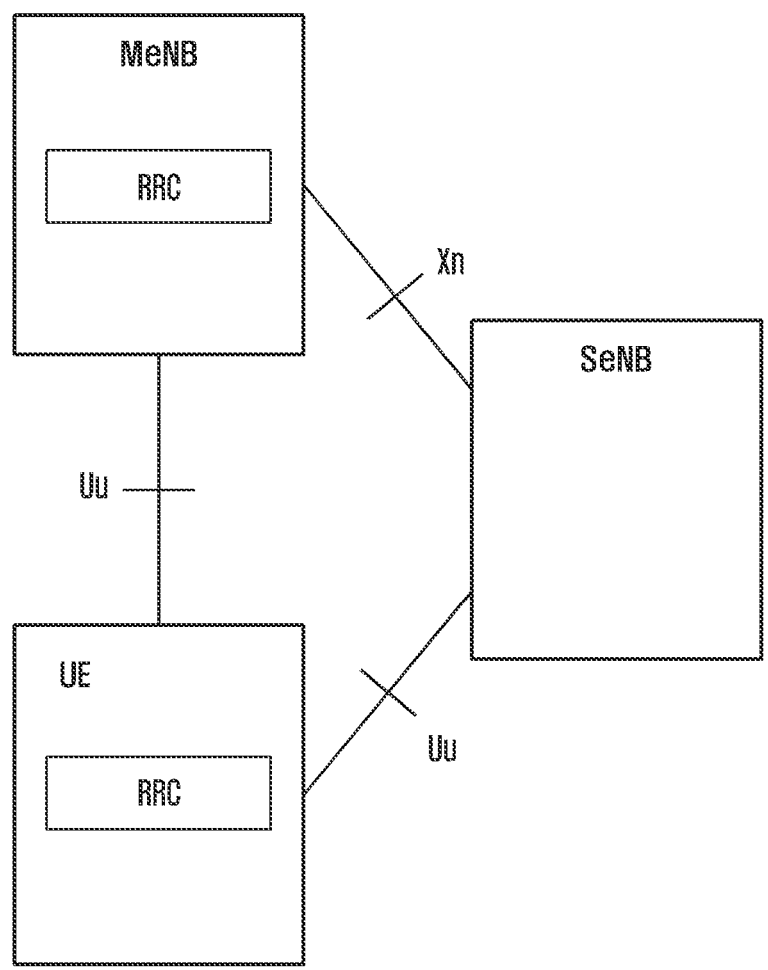
FIG. 4 illustrates a control plane architecture for dual connectivity.
Figure 6:
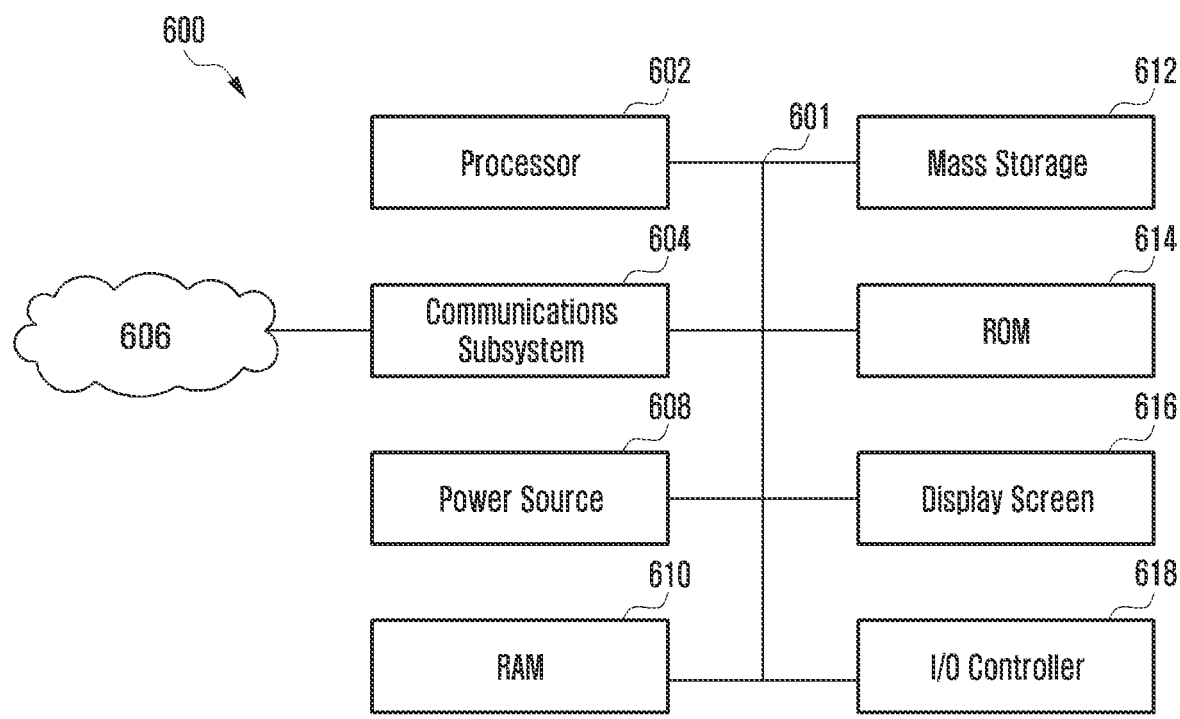
FIG. 6 shows a block diagram illustrating selected components of a UE foe use in a wireless communication network as shown in FIGS. 1 and 2.

FIG. 6 shows a block diagram illustrating some example components comprised in an example UE 600 that can be used in the LTE-enabled wireless network as shown in FIG. 1. The UE 600 may be a wireless device and its associated Universal Integrated Circuit Card (UICC) that includes a Subscriber Identity Module (SIM) application, a Universal Subscriber Identity Module (USIM) application, or a Removable User Identity Module (R-UIM) application or the UE 600 might be the device itself without such a card.

UE 600 includes multiple components linked by a communications bus 601. A processor 602 controls the overall operation of the UE 600. Communication functions, including data and voice communications, are performed through a communication subsystem 604. The communication subsystem 604 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. The communication subsystem 604 may enable the processor 602 to communicate with the Internet or one or more telecommunications networks or other networks from which the processor 602 might receive information or to which the processor 602 might output information.

In the context of FIG. 1, the communication subsystem 604 receives messages from and sends messages to wireless network 606 which may be the E-UTRAN 104 shown in FIG. 1 for voice communications or data communications or both.

A power source 608, such as one or more rechargeable batteries or a port to an external power supply, powers the UE 600.

The processor 602 interacts with other components of the electronic device including Random Access Memory (RAM) 610, mass storage 612 (including but not limited to magnetic and optical disks, magnetic tape, solid state drives or RAID arrays), Read Only Memory (ROM) 614 and display screen 616, which may be, for example, a Liquid Crystal Display (LCD). An i/o controller 618 sends and receives signals relative to one or more user control devices, such as a touch sensitive overlay on the display screen 616 to enable user interaction with the UE 600.

The processor 602 executes instructions, code, software or computer programs it may access from communications subsystem 604, RAM 610, mass storage 612 or ROM 614. The processor 602 may comprise one or more data processing units or CPU chips. The processor 602 may execute the instructions solely by itself, or in concert with other locally or remotely provided data processing components or other components not shown in FIG. 6. In particular, the processor 602 is capable of carrying out instructions such that the UE 600 is operable to perform wireless communications in an LTE network in accordance with the disclosure set out below.

For example, the processor 602 may carry out instructions to instantiate and maintain a communications manager in RAM 610 that in use operates the communications subsystem 604 to perform signalling to interact with E-UTRAN 104.

Figure 5A:
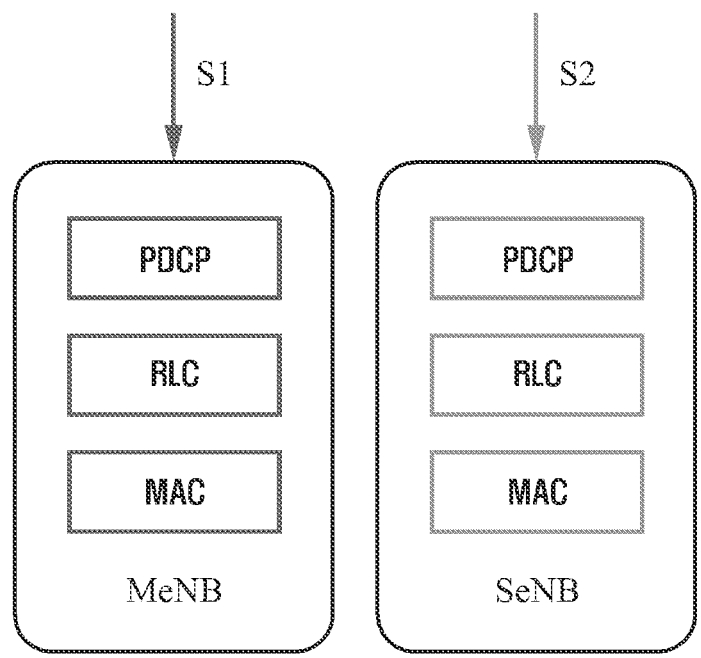
FIG. 5A illustrates a RAN protocol stack at a MeNB and a SeNB for the split bearer of FIG. 3A.
Figure 5B:
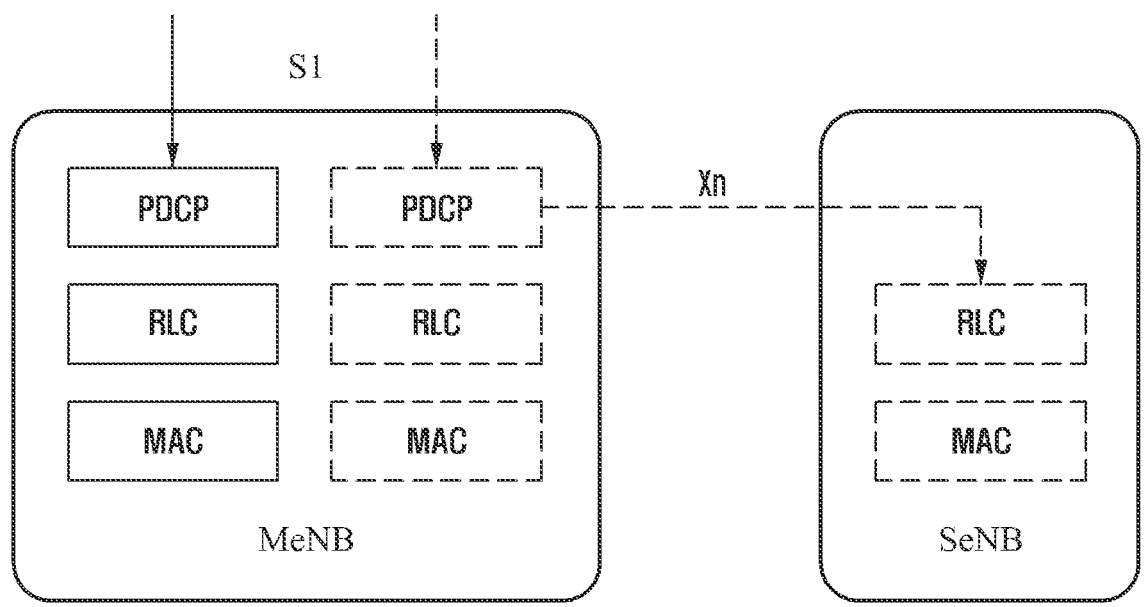
FIG. 5B illustrates a RAN protocol stack at a MeNB and a SeNB for the split bearer of FIG. 3B.

The communications manager may instantiate, for example in the RAM 610 of UE 600, an LTE protocol stack to provide as described above in relation to FIGS. 5A and 5B, at the Access Stratum layers of LTE, one or more of a Radio Resource Control (RRC) signalling layer that is typically responsible for the control of radio related functions, a Packet Data Convergence Control (PDCP) signalling layer that is typically responsible for header compression and security, a Radio Link Control (RLC) signalling layer that is typically responsible for the retransmission of lost data, a Medium Access Control (MAC) signalling layer that is typically responsible for controlling access to the Physical Layer (PHY). Of course, layers of the protocol stack may be implemented elsewhere, for example the MAC and PHY signalling may be provided in the UE by firmware or hardware and so not maintained in RAM 610. Indeed, the implementation of the protocol stack in the RAM 610 UE described above is only one example of many possibilities within the scope of the present disclosure, and is provided for explanatory purposes only.

As mentioned above, the LTE system includes protocols such as a Radio Resource Control (RRC) protocol, which is responsible for the assignment, configuration and release of connections and radio resources between the UE 102 and the eNBs of the E-UTRAN 104 or other access or LTE equipment. These protocols will have to define signalling and operations at the UE, the MeNB of the MCG and the SeNB of the SCG in order to govern how these components of the wireless communications network operate and interact to support dual connectivity.

In order to reduce unnecessary repetition of UE actions on reconfiguration of the DRB and/or on DRB type change, the present application provides a method in which a UE determines layer 2 actions to be taken based on the target DRB type and configuration, rather than on individual fields of the signalled reconfiguration. This will now be described in more detail with reference to FIG. 7.

According to the LTE standard, the UE modifies the radio configuration (including the layer 2 user plane configuration comprising one main MAC configuration and a logical channels, RLC and PDCP configuration per radio bearer) either:

a. Upon receiving (from the MeNB) a reconfiguration message including configuration parameters b. Upon receiving a message triggering a specific action e.g. upon handover, the UE first resets MAC, re-establishes PDCP and RLC for every DRB that is established c. Upon occurrence of a specific event e.g. when the UE initiates connection re-establishment, it releases the Secondary Cells (SCells)

The configuration parameters that are signalled to the UE by the MeNB, can either concern Delta signalling: Changes compared to the configuration/ the configuration at the time the signalled parameters are processed (i.e. before the UE processes the configuration parameters received, the UE may trigger actions resulting in a change of the configuration e.g. upon handover). As will be understood from the description below, currently delta signalling is supported in LTE on normal reconfiguration and on handover.

Full signalling: the entire configuration the UE shall apply, irrespective of the current configuration For Dual Connectivity, it has been agreed through 3GPP working group discussions that:

An SCG change procedure is to be specified i.e. a reconfiguration message including release of the current SCG as well as the addition of an SCG. The newly added SCG may include cells that were present of the former SCG, in which case the new SCG is handled by the same SeNB Upon handover, the SCG is either released or, if the MeNB wants to continue DC, it can perform an SCG change as part of the handover No constraints were agreed regarding the SCG change procedure e.g. that it or some specific cases can only be done in combination with handover In case of a change of DRB type from a split DRB to MCG DRB, the MCG-RLC is not re-established i.e. the UE merely releases SCG-RLC A proposal submitted to the 3GPP working group on small cell enhancements as document R2-141940 largely covers the PDCP operation in DC to be performed in cases involving: change of DRB type, SCG addition/change/release, reconfiguration of UL path of split DRB. In summary the paper indicates that:

a. Upon change of an MCG DRB to a split DRB, there is no need for any specific PDCP actions other than configuring the UL data path (i.e. which CG the UE shall apply for UL data)

b. Upon move of the PDCP entity between MeNB and SeNB, the UE performs a PDCP re-establishment alike upon HO without DC c. Upon SCG change, the UE performs a PDCP re-establishment for SCG DRBs alike upon HO without DC d. Upon change of a split DRB to an MCG DRB, the UE performs a partial PDCP re-establishment (merely of the SCG part)

e. Upon SCG change, the UE performs a partial PDCP re-establishment for split DRBs The above list shows that there are multiple triggers for a (partial) PDCP re-establishment. Moreover, a single reconfiguration message received by the UE may result in multiple triggers e.g:

If a reconfiguration message including SCG change is also used to change DRB type of an SCG DRB to an MCG DRB e.g. because the target SeNB is somewhat loaded, the UE detects both trigger (b) and (c) for the concerned SCG DRB If a reconfiguration message including SCG change is also used to change DRB type of a split DRB to an MCG DRB (for similar reasons), the UE detects both trigger (d) and (e) for the concerned split DRB A handover message including SCR release may also include change of DRB type of an SCG DRB to an MCG DRB (or it might be performed autonomously by the UE, as in B.7), the UE may again detect multiple triggers for PDCP re-establishment As indicated in the previous, SCG change is assumed to be signaled by release of the current SCG and addition of a possibly different SCG. In such cases, on the basis of the current specification, the UE would normally first take action based on a field indicating release of the SCG and subsequently take action based on another field indicating addition of a new SCG.

It is undesirable if a single reconfiguration message would result in the UE to trigger, for example, PDCP re-establishment more than once as it could even result in the UE transmitting multiple PDCP status reports. It might even be so that a reconfiguration message includes a first reconfiguration that alone would trigger a certain action, but in combination with another reconfiguration should result in no or a different action.

To avoid unnecessary repetition by the UE of certain actions, which would lead to increased signaling and decreased performance, in accordance with the present disclosure the UE should be configured to not take action immediately upon detecting an individual trigger, but should instead take into account the complete initial and the complete final configuration, as well as any relevant reconfiguration procedure types of the DRB.

Figure 7:
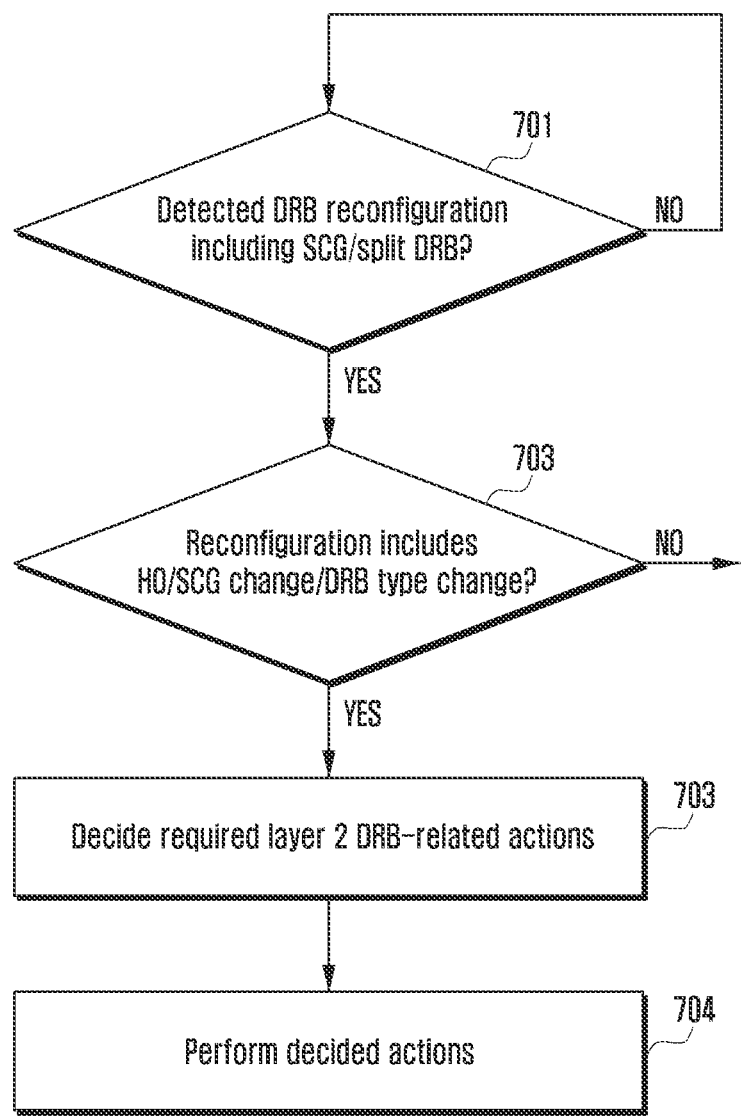
FIG. 7 is a flowchart illustrating a method of a UE for taking action on DRB reconfiguration and/or DRB type change in DC.

Thus, referring to FIG. 7, which shows a flowchart illustrating a method of a UE for taking action on DRB reconfiguration and/or DRB type change in DC, the UE is configured at step 701 to detect a signalled reconfiguration procedure of a DRB having or changing to a SCG DRB or a split DRB type. That is, the DRB type change or DRB reconfiguration is to change from or to a DRB in which downlink, DL, data is received from only serving cells of a Secondary Cell Group, SCG, connected to a Secondary eNB, SeNB, via an SCG DRB, or in which DL data is received from a SCG and also from serving cells of a Master Cell Group, MCG, connected to a Master eNB, MeNB, via a split DRB. At step 702, the UE determines if a DRB reconfiguration procedure type including one or more of: a handover; an SCG change; and DRB type change; is detected. If the answer at the decision point in step 702 is yes, then at step 703 the UE decides one or more required layer 2 DRB-related actions resulting from the DRB reconfiguration based on: the initial DRB configuration; the final DRB configuration; and relevant DRB reconfiguration procedure types. At step 704, the UE then performing said decided layer 2 DRB-related actions.

If the answer at the decision point in step 702 is no, then at step 705 the UE continues as per the current specification. I.e. the reconfiguration may include other configuration changes that the UE still needs to perform as per the current specification. FIG. 7 focusses on the additional layer 2 DRB-related actions upon DRB type reconfiguration as well as handover and/or SCG establishment/change/release.

It is noted that more generally, the present application provides that the resulting layer 2 DRB-related actions performed by the UE depend on the (reconfiguration) procedure type and the DRB type reconfiguration. Here, (reconfiguration) procedure type is defined as generalised term for the combination of {normal reconfiguration, handover} and {SCG establishment, SCG change, SCG release} procedures.

In accordance with the above-described method, if when deciding one or more required layer 2 DRB-related actions resulting from the DRB reconfiguration, multiple triggers for an action are generated, the method may enable the UE to decide to perform the action only once. For example, when the required layer 2 DRB-related actions include a Packet Data Convergence Protocol, PDCP, re-establishment action, and if when deciding one or more required actions resulting from the DRB reconfiguration, multiple triggers for the same PDCP re-establishment action are generated, the UE may decide to perform the PDCP re-establishment action only once.

The L2 flush operations currently in LTE are performed upon handover, in which case delta signalling is used. However, as will be shown below, the present application provides that the use of delta signalling should be supported not just on HO, but also on SCG change and on DRB type change i.e. the other cases in which such L2 flush operations are performed.

The following analysis involved an in depth consideration of the details of how to specify the behaviour of a UE configured with DC upon receiving a reconfiguration message including handover, SCG change and/or change of DRB type. The analysis was not limited to PDCP, but also covered MAC and RLC.

As indicated above, upon SCG change, the reconfiguration message sent from the RAN includes a release and addition of the SCG meaning that all SCG configuration parameters are signalled. As indicated in the previous, the PDCP operation is the same as performed upon handover. In case of handover, E-UTRAN does normally however only signal the changes compared to the current configuration (i.e. delta signalling). The protocol does however also include an option to provide the full configuration upon handover, targeted to address the case the target eNB is does not comprehend the current configuration as it supports a lower release of the protocol. Table 1 below summarises the action currently specified upon handover (without/with fullConfig), listed in sequential order.

TABLE 1

Actions currently specified on handover for delta and full signaling

| Handover/delta | Handover/fullConfig |
|---|---|
| Reset MAC | |
| Re-establish PDCP for all RBs that are established | |
| Re-establish RLC for all RBs that are established | |
| Consider SCells to be deactivated | |
| Apply the received CRNTI, resourceConfigDed & mobilityControlInfo | Release the current configuration (common if mobilityControlInfo included) Apply the default configuration (Phy, SPS, MAC main), logical channel and RLC for SRB1/2 For EPS included in drb-ToAddModList (i.e. continuing): release PDCP/RLC/DTCH entities & DRB identity For other EPS bearers: same, but also inform upper layers about the release |
| Reconfigure security | |
| Apply other configurations received (SCells, measConfig, otherConfig) | |
| If RA success, consider procedure completed successfully | |

Some further remarks on the above specification for HO are as follows:

In case of fullConfig, the UE still performs reset/re-establishment of L2 before it releases the entities, which seems redundant The reset of MAC that is performed upon handover is considered to be functionally equivalent to release+addition of the MAC entity, as would be performed upon release and addition of the SCG The reset of RLC that is performed upon handover is considered to be not entirely functionally equivalent to release+addition of the RLC entity. I.e. for release of an RLC entity the specification does not explicitly state/mandate reassembly of RLC SDUs and their forwarding to upper layers (as is done upon RLC re-establishment). It seems that the UE should however preferably perform this operation upon RLC release also (even though currently not mandated)

From the above, turning now to consider, an SCG change procedure when using release and addition upon SCG change (i.e. no delta signalling):

the UE operation to be performed at RLC and MAC layers does not seem to require any specification as it automatically follows from the release and addition of the concerned entity The UE operation to be performed at PDCP is however different from a simple release and addition of the concerned entity i.e. the PDCP entity really needs to continue and perform some actions to avoid data loss.

It is however possible to model this operation, but it means the UE cannot process the received fields drbToReleaseList and drbToAddModList independently, but has to recognise that the DRB actually continues In the previous, it was indicated that the UE not just needs to consider SCG change but also DRB type change and thus anyhow needs to analyze both fields to decide the required action If delta signalling were supported upon SCG change, however, the analysis undertaken has shown that:

The UE operation to be performed at RLC and MAC layers would require statements similar to the ones for handover The UE operation at PDCP can be specified similar to handover. If the operation is needed for cases not involving handover (i.e. where SCG change is performed not as part of handover), a separate field would need to be introduced to trigger this The analysis has shown that the same applies were delta signalling supported upon DRB type change even when it involves a move of PDCP from MCG to SCG configuration (i.e. a change of DRB type from MCG or split to SCG DRB) or vice versa. It has been found that in this case delta signalling would have the advantage that we can align the PDCP, RLC and MAC operation with the behaviour as performed upon handover.

It is recognized that the supporting of delta signalling on DRB type change implies that the reference for the delta configuration signalling differs depending on the case, i.e:

In case the reconfiguration does not involve a move of PDCP: the reference PDCP configuration is part of the configuration of the Cell Group (CG) including PDCP (i.e. intra-CG)

In case the reconfiguration involves a move of PDCP: the reference is the PDCP configuration is part of the configuration of the Cell Group (CG) currently including PDCP (i.e. inter-CG)

However, there is one PDCP configuration per DRB and even though it moves between cell groups one can regard that in both cases the current PDCP configuration is the reference As indicated in the previous, upon SCG change (as well as upon DRB type change) the PDCP cannot be released and added/created again because this would involve unacceptable data loss. This requires the PDCP internal state/context to be maintained. Still, the UE needs to take into account the PDCP configuration that is signalled by E-UTRAN. As the PDCP existing entity continues, if full signalling were used rather than delta signalling, one way to do this would be for the UE to itself derive the delta to the current configuration even though E-UTRAN signals the full configuration. The UE can do this by comparing the received full configuration with the current configuration.

An example of this proposed PDCP configuration handling by the UE on full signalling and delta signalling on an SCG change procedure is as follows. Suppose that: the PDCP configuration includes 5 optional fields (configurationparameters) i.e. field1 to field5; and that the UE is currently configured with field1, field3 and field4.

Full signalling: If the E-UTRAN wants to configure the UE with field1, field2 and field4, and it wants to modify the value of field1 and it applies full config, and thus signals (besides the field indicating the UE shall release the current config i.e. fullConfigSCG), the complete new configuration in SCG-ConFIG. I.e. it would include field1, field2 and field4.

The UE however, would not release the current PDCP configuration, but it instead compares the received full configuration with the current configuration and determines the differences (i.e. the delta) and the corresponding changes which in this case would be: modification of field1 (as the received value differs), addition of field2 (as this is currently not configured) and release of field3.

Delta signalling: If the E-UTRAN wants to configure the UE with field1, field2 and field4, and it wants to modify the value of field1 and it applies delta signalling, it thus signals (besides the field indicating the SCG change procedure i.e. that UE shall perform a L2 flush), the changes compared to the current SCG configuration i.e. it would include field1 (to indicate the new value), field2 (as currently not configured) and an indication the UE shall release field3. The UE would apply these changes to the SCG configuration and continue the PDCP entity.

Both approaches (use of delta signalling and full signalling of DRB configuration parameters on SCG change and DRB type change) seem to be possible, and merely result in different conditions to trigger the same/similar UE behaviour.

Introducing support for delta signalling on SCG change and DRB type change would not seem to introduce much additional complexity, we could consider to allow delta signalling upon SCG change. However, the UE and the eNBs operating as the MeNB and the SeNBs need to be configured to support delta signalling.

Figure 8:
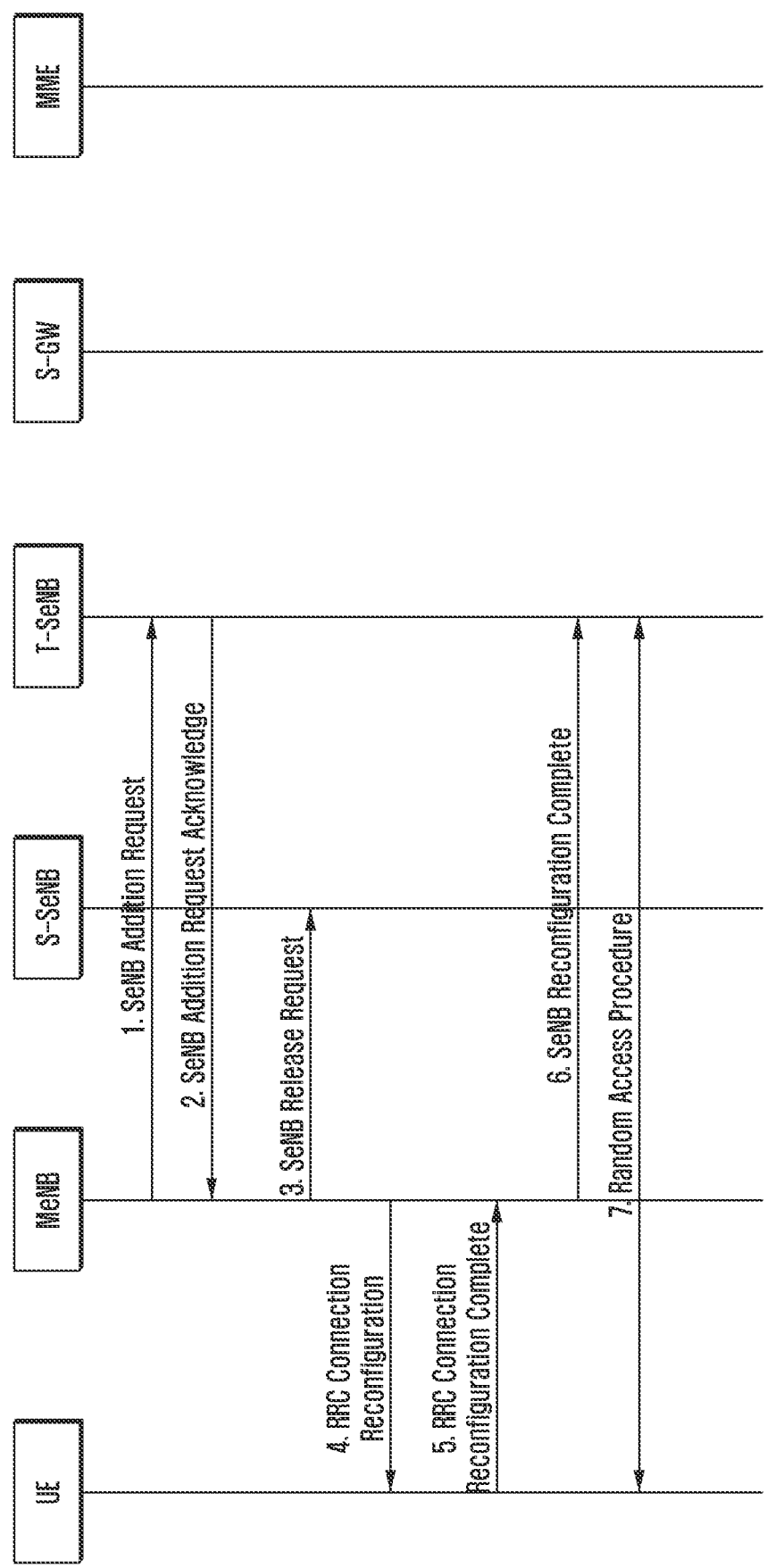
FIG. 8 is a message sequence chart showing an SeNB change procedure implementing delta signalling.

FIG. 8 is a message sequence chart showing an SeNB change procedure supporting delta signalling. At step 1, the MeNB sends an SeNB Addition Request message to the target SeNG (T-SeNB) as an AP message over X2 interface. The SeNB Addition Request is modified to include the SCG-Configuration set according to the configuration currently assigned to the UE. This may be included in the RRC Inter-node message SCGConfigInfo included in the X2 AP message.

At step 2 the T-SeNB sends an SeNB Addition Request Acknowledge message to the MeNB as an AP message over the X2 interface. The X2 AP message SeNB Addition Request Acknowledge is modified to include a field to indicate that the UE should perform the operations defined for SCG-Change i.e. to reset/release MAC, to re-establish/release RLC and to re-establish PDCP. This may be included in the RRC Inter-node message SCGConfig(uration) included in the X2 AP message. The T-SeNB sets the/a fullConfigSCG field indicating whether the UE should release the entire SCG-Configuration before applying the signaled SCG-configuration i.e. indicating to not apply delta signalling. This is included in the RRC Inter-node message SCGConfig(uration) included in the X2 AP message SeNB Addition Request Acknowledge At step 3, the MeNB sends an SeNB Release Request Message to the source SeNB (S-SeNB) and at step 4 the MeNB sends an RRC Connection Reconfiguration Message to the UE over the Uu air interface. The RRC message RRCConnectionReconfiguraton is modified to include a field to indicate that the UE should perform the operations defined for SCG-Change i.e. to reset/release MAC, to re-establish/release RLC and to re-establish PDCP. This may be included in the RRC IE SCG-Configuration that may be included in this RRC message. Here the SGC configuration includes a delta configuration that the UE applies to the current PDCP configuration for the PDCP entity that continues. If delta signalling is not indicated and instead the RRCConnectionReconfiguraton indicates an SCG release and add, the UE, instead of releasing the SCG Configuration itself determines the delta from the fully signalled configuration parameters, and the UE applies this derived delta to the current PDCP configuration for the PDCP entity that continues.

At step 5 the UE sends an RRC Connection Reconfiguration Complete message to the MeNB over the Uu air interface. Thereafter the MeNB sends an SeNB Reconfiguration Complete message to the T-SeNB over the X2 interface and in step 7 the UE then performs a Random Access Procedure with the T-SeNB to synchronize with and gain access to the SeNB.

Figure 9:
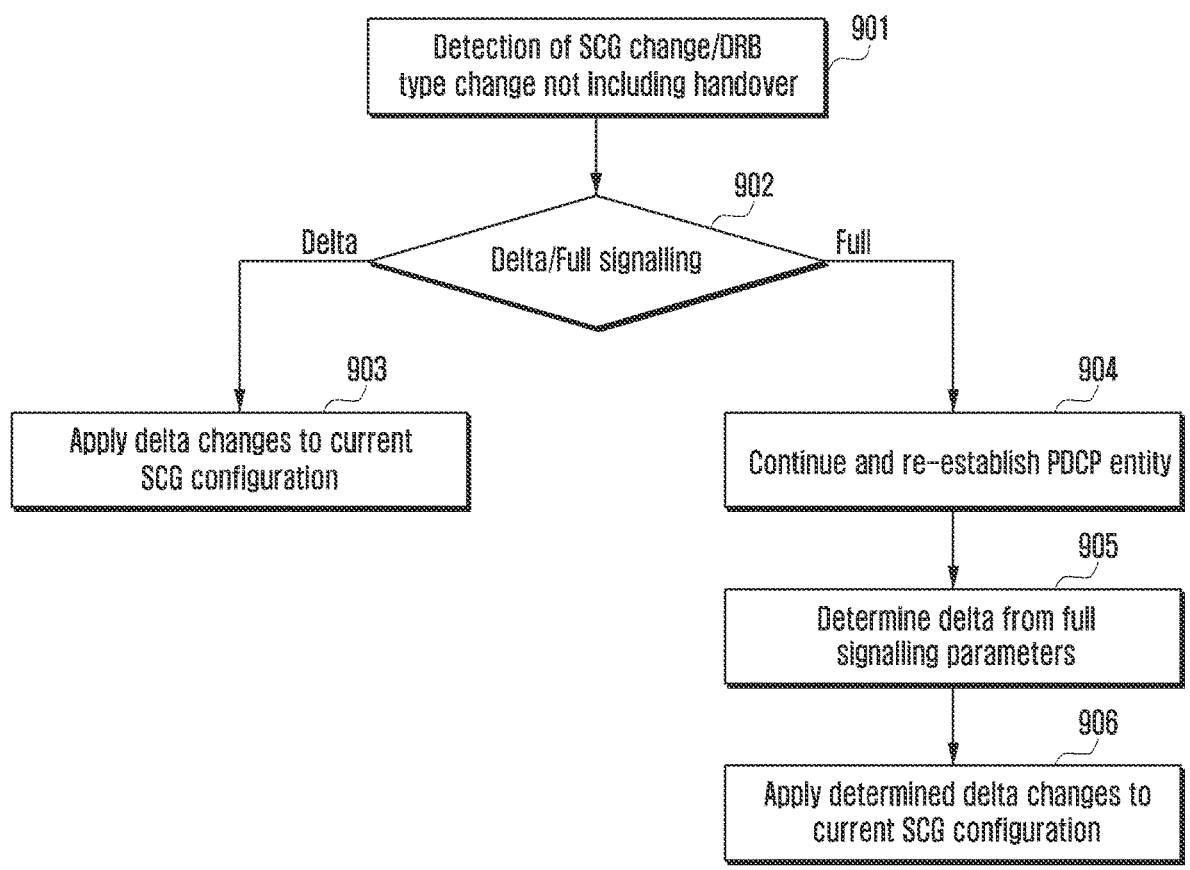
FIG. 9 is a flowchart illustrating a method of a UE for supporting delta signalling on SCG change and DRB type change.

Thus, to enable a UE to support delta signalling on SCG change and DRB type change, the present application provides a method of a UE as shown in the flow chart of FIG. 9. Here, in step 901, the UE detects a signalled DRB reconfiguration including an SCG change procedure or DRB type change not including handover. This may be by an SCG change or DRB type change is indicated in the RRC Connection Reconfiguration message. For example, the mobilityControlInfoSCG field of the RRC Connection Reconfiguration message may indicate an SCG change procedure. At step 902, it is determined if delta signalling is used of if full signalling is used. If delta signalling is used, at step 903 the UE applies received signalled changes compared to the current SCG configuration parameters to update the stored SCG parameters. The method further comprises: flushing the layer 2 of Service Data Units, SDUs; releasing and adding the SCG-MAC entity; re-establishing the SCG-RLC entity; and continuing and re-establishing the PDCP entity for the SCG DRB that is established.

Alternatively, if at step 902 it is determined that full SCG configuration signalling is received upon an SCG change procedure or DRB type change not including handover (for example by receipt of an SCG release and add instruction by virtue of a fullConfigSCG field of the DRB reconfiguration message), at step 904 the UE continues and re-establishes the PDCP entity for the SCG DRB that is established. At step 905 the UE determines, from the signalled full SCG configuration, the delta (i.e. the changes) to the current PDCP configuration necessary to reconfigure the PDCP. At step 906 the UE applies the determined changes.

Similarly, to enable an eNB acting as an MeNB to support delta signalling on SCG change and DRB type change, the present application provides a method of an eNB. Here, the eNB transmits signalling of a reconfiguration procedure of a DRB on SCG change or DRB type change. If the eNB and target SeNB support delta signalling on SCG change or DRB type change not including handover, the eNB signalling indicates an SCG change procedure or DRB type change not including handover and the eNB signals the delta (i.e. changes) compared to the current SCG configuration parameters. The eNB itself derives the delta. The indication for the UE to perform the operations defined for SCG change (i.e. to reset/release MAC, to re-establish/release RLC and to re-establish PDCP) may comprise using the mobilityControlInfoSCG field of the RRC connection reconfiguration message.

If the eNB and target SeNB do not support delta signalling on SCG change or DRB type change not including handover, the eNB may signal a full SCG configuration and an indication that an existing SCG configuration should be released before applying the signalled SCG configuration. For example, the fullConfigSCG field can be used to indicate for the UE to release the entire SCG configuration before applying a signalled SCG configuration. The indication for the UE to release the entire SCG configuration before applying a signalled SCG configuration can be received from and/or generated by an SeNB.

The MeNB may further transmit to a target SeNB the SCG configuration upon inter-SeNB SCG change (i.e. within the SeNB addition Request message it sends to the target SeNB).

Upon a change of MeNB, the MeNB may further transmit to a target MeNB the SCG configuration upon inter-MeNB handover (i.e. within the X2 AP message Handover Request that it sends to the target MeNB. This would be included in the RRC inter-node message HandoverPreparationInformation that is contained in this X2 AP message).

It should be noted that the fullConfig parameter was introduced to support mobility towards a node supporting the ASN.1 of a lower protocol version. Such a node namely receives a configuration including extension that it does not comprehend. As the node does cannot generate the normal signalling used to release the functionality associated with such extensions, a field was introduced merely indicating the UE shall release the entire configuration (fullConfig). In case of handover towards from an SeNB supporting a late protocol version to an SeNB supporting an early version (i.e. REL-12) a similar solution is can be used i.e. that the target SeNB can decide that the UE should release the entire SCG configuration. Thus when delta signalling is supported upon SCG change, the SeNB is assumed to be the proper node to decide the fullConfigSCG parameter, as described above.

Currently three different SCG reconfiguration procedures are defined a) normal SCG reconfiguration, b) synchronous SCG reconfiguration i.e. a field is included indicating the UE should perform Random Access (RA) towards the PSCell, c) SCG change i.e. a procedure involving release and addition of the SCG i.e. including flushing of the layer 2 (and also involving RA towards PSCell). As for the MCG there is no option to perform an RA without doing flushing of layer 2, one could debate the need to support option b). In case this option is removed, the field that is currently assumed to indicate the UE should perform RA i.e. mobilityControlInfoSCG, could actually be used to indicate the UE should perform SCG change, as described above.

An analysis determining the complete UE behaviour upon handover, SCG change and/or DRB type change has been performed and is set out in Table 2 below. It should be noted that the table describes the UE actions only and is based on the assumption that upon release of an RLC entity the UE flushes to upper layers. Importantly, it should also be noted Table 2 covers the case where full signalling is used upon SCG change as well as upon DRB type changes. Some remarks about additional statements that would need to be introduced to if delta signalling were used are set out below.

In case there is UE operation applicable in every cell of a row/column, this behaviour is included in the edge cell i.e. the leftmost/top cell respectively.

TABLE 2

Setting out complete UE behaviour

| | 1. Normal reconfiguration | 2. Handover with SCG change MCG-MAC: reset SCG-MAC: rel + add | Handover with SCG release MCG-MAC: reset SCG-MAC: rel | 3. SCG change SCG-MAC: rel + add | 4. SCG release SCG-MAC: rel | 5. SCG establishment SCG-MAC: add |
|---|---|---|---|---|---|---|
| a. MCG (no DRB type change) | None | PDCP: re-establish MCG-RLC: re-establish | PDCP: re-establish MCG-RLC: re-establish | None | None | None |
| b. Split (no DRB type change) | None | PDCP: re-establish MCG-RLC: re-establish SCG-RLC: rel + add | Not possible | PDCP: partial re-establish SCG-RLC: rel + add | Not possible | Not possible |
| c. SCG (no DRB type change) | None | PDCP: re-establish SCG-RLC: rel + add | Not possible | PDCP: re-establish SCG-RLC: rel + add | Not possible | Not possible |
| d. MCG→Split PDCP: UL route SCG-RLC: add | None | PDCP: re-establish MCG-RLC: re-establish (not essential) | Not possible | None (not essential) | Not possible | None |
| e. MCG→SCG MCG-RLC: rel SCG-RLC: add | PDCP: re-establish | PDCP: re-establish (not essential) | Not possible | PDCP: re-establish (not essential) | Not possible | PDCP: re-establish |
| f. Split→SCG MCG-RLC: rel SCG-RLC: rel + add | Not possible | PDCP: re-establish (not needed in Rel-12) | Not possible | PDCP: re-establish (not needed in Rel-12) | Not possible | Not possible |
| g. SCG→split MCG-RLC: add SCG-RLC: rel + add | Not possible | PDCP: re-establish (not needed in Rel-12) | Not possible | PDCP: re-establish (not needed in Rel-12) | Not possible | Not possible |
| h. SCG→MCG MCG-RLC: add SCG-RLC: rel | PDCP: re-establish | PDCP: re-establish | PDCP: re-establish | PDCP: re-establish | PDCP: re-establish | Not possible |
| i. Split→MCG SCG-RLC: rel | PDCP: Partial re-establish | PDCP: Re-establish MCG-RLC: re-establish | PDCP: re-establish MCG-RLC: re-establish | PDCP: Partial re-establish | PDCP: Partial re-establish | Not possible |

There does not seem to be a real need to move traffic towards SCG immediately upon handover, while moving traffic in the other direction seems important to support (as the target SeNB may not be able to admit the same DRBs). The latter could also be debated as RAN2 earlier agreed that inter-SeNB SCG change upon handover is not really essential for REL-12.

As a result, all cases in the table need to be supported for DC, with the following exceptions. The cells that are shaded out correspond to cases that do not exist. The cases where an SCG establishment is performed in which the DRB type changes from MCG to SCG or split might need to be supported e.g. if we want to avoid an SCG without DRB. The cases where an SCG change is performed (as part of a handover or otherwise) in which the DRB type changes from MCG to SCG or split do not seem essential to support, but could be supported if they do not introduce additional complexity. The cases where an SCG change is performed (as part of a handover or otherwise) in which the DRB type changes between SCG and split need not be supported in Rel-12.

Referring to Table 2, it can be seen that the 'cell-specific' action (i.e. the action not commonly applicable for all concerned row/column cells) only includes the following items:

PDCP re-establishment, Partial PDCP re-establishment

MCG-RLC re-establishment (although it is not needed this operation could actually always be done upon handover i.e. when the MCG-RLC entity is released, without a significant detrimental effect)

Release/addition of SCG-RLC entity upon SCG change (with/without handover) obviously applies only in case the current configuration includes an SCG-RLC entity (i.e. not for MCG DRB). This could be reflected in the top row Taking this into account, the table of complete UE behaviour can be simplified, as shown in Table 3.

TABLE 3

Simplified table setting out complete UE behaviour

| | 1. Normal reconfiguration | 2. Handover with SCG change PDCP: re-establish MCG-MAC: reset MCG-RLC: re-establish SCG-MAC: rel + add SCG-RLC: rel + add, if split/SCG DRB (source config) | Handover with SCG release PDCP: re-establish MCG-MAC: reset MCG-RLC: re-establish SCG-MAC: rel | 3. SCG change SCG-MAC: rel + add SCG-RLC: rel + add, if split/SCG DRB (source config) | 4. SCG release SCG-MAC: rel | 5. SCG establishment SCG-MAC: add |
|---|---|---|---|---|---|---|
| a. MCG (no DRB type change) | None | None | None | None | None | None |
| b. Split (no DRB type change) | None | None | Not possible | PDCP: partial re-establish | Not possible | Not possible |
| c. SCG (no DRB type change) | None | None | Not possible | PDCP: re-establish | Not possible | Not possible |
| d. MCG→Split PDCP: UL route SCG-RLC: add | None | None (not essential) | Not possible | None (not essential) | Not possible | None |
| e. MCG →SCG PDCP re-establish MCG-RLC: rel SCG-RLC: add | None | None (not essential) | Not possible | None (not essential) | Not possible | None |
| f. Split →SCG PDCP re-establish MCG-RLC: rel SCG-RLC: rel + add | Not possible | None (not needed in Rel-12) | Not possible | None (not needed in Rel-12) | Not possible | Not possible |
| g. SCG →split PDCP re-establish MCG-RLC: add SCG-RLC: rel + add | Not possible | None (not needed in Rel-12) | Not possible | None (not needed in Rel-12) | Not possible | Not possible |
| h. SCG →MCG PDCP re-establish MCG-RLC: add SCG-RLC: rel | None | None | None | None | None | Not possible |
| i. Split →MCG SCG-RLC: rel | PDCP: Partial re-establish | None | None | PDCP: Partial re-establish | PDCP: Partial re-establish | Not possible |

Several actions performed upon handover are already covered by the current procedural specification, i.e. PDCP: re-establish, MCG-MAC: reset, MCG-RLC: re-establish.

Several actions indicated in the table are the normal actions performed upon receiving the field indicating the concerned action (meaning that in the procedural specification this is implicitly already covered by the procedural specification): XCG-MAC rel/add, XCG-RLC rel/add, PDCP UL route (data path). Whether this is the case for release of MCG-RLC upon DRB type change depends on the actual signalling details. Let's assume that upon change from Split to SCG-DRB, the signalling indicates release of the SCG-RLC. In case delta signalling would be used upon SCG change (meaning the RLC and MAC fields are not released and added), statements need to be introduced to reflect SCG-MAC is reset and SCG-RLC is re-established Taking into account the above means that the procedural specification merely needs to additionally cover the UE actions underlined in the Simplified Table 3 above. That the UE shall perform (assuming full signalling on SCG change and DRB type change):

PDCP re-establishment upon DRB type change MCG↔SCG, split↔SCG, as well as of SCG DRB upon SCG change Partial PDCP re-establishment upon DRB type change split→MCG upon reconfiguration other than HO, as well as of split DRB upon SCG change Thus, the present application provides a method of a UE having additional specified actions to completely specify the UE actions required to perform DRB reconfiguration procedures and DRB type changes in DC. That is, the UE, on detecting reconfiguration of a DRB having or changing to a split DRB or SCG DRB type, if the reconfiguration includes: a reconfiguration procedure type not including handover for DRBs in which the DRB type changes between (a) a split DRB or an MCG DRB; and (b) an SCG DRB; or an SCG change procedure for an SCG DRB; the UE re-establishes the PDCP entity for the concerned DRB. Alternatively, or in addition, the UE, on detecting reconfiguration of a DRB having or changing to a split DRB or SCG DRB type, if the reconfiguration includes: a reconfiguration procedure type not including handover for DRBs in which the DRB type changes from a split DRB to an MCG DRB in which DL data is received only from serving cells of a MCG; or an SCG change procedure for a split DRB; the UE partially re-establishes the PDCP entity for the concerned DRB.

The partial PDCP re-establishment operation that has been identified as being needed may actually be unnecessary. It has been realized that it may actually be better to avoid the additional complexity of introducing this partial PDCP re-establishment and instead always trigger a complete PDCP re-establishment in the cases currently assumed to trigger a partial PDCP re-establishment. This can be achieved if a UE configured with a split DRB performs a regular PDCP re-establishment (alike in case of HO without DC) when the DRB is changed to MCG DRB, as well as upon SCG change. In fact, in these cases, if reconfiguration including: a reconfiguration procedure type not including handover for DRBs in which the DRB type changes from a split DRB to an MCG DRB in which DL data is received only from serving cells of a MCG; or an SCG change procedure for a split DRB; occurs, the MeNB may initiate handover procedures and signal the UE appropriately (e.g. by including field mobilityControlInfo field in the RRC Connection Reconfiguration message).

Thus the present application provides an alternative to partial PDCP re-establishment, in that a UE is configured such that if reconfiguration including: a reconfiguration procedure type not including handover for DRBs in which the DRB type changes from a split DRB to an MCG DRB; or an SCG change procedure for a split DRB; occurs and signalling indicating handover procedures is received; then the UE performs the procedures indicated for handover.

Given the above signalling and procedures needed for configuring and reconfiguring a UE with DC, an efficient signalling mechanism between the E-UTRAN and the UE is desirable. In case E-UTRA configures a UE with Dual Connectivity, the dedicated UE radio configuration comprises 2 parts: an MCG configuration and an SCG configuration. The MeNB has overall responsibility for setting the UE configuration parameters, and in particular solely controls the MCG configuration. The SeNB generally decides the values of the SCG configuration parameters, but the MeNB may specify some constraints/limitations to be observed by SeNB in order to ensure that the combination of MCG and SCG configuration does not exceed the capabilities of the UE. Generally, the SCG configuration as signalled to the UE is generated by the SeNB. However, there are some exceptions where SCG configuration as signalled is generated by the MeNB. For example:

The MeNB may generate a field indicating that the UE shall release the entire SCG.

The MeNB signals the Small Cell Counter (SCC) that the UE uses when deriving the security key associated with the SCG (i.e. the S-KeNB) from the security key associated with the MCC/MeNB The MeNB may decide to release a split DRB, in which case both the MCG and SCG parts of the DRB configuration need to be released. It is not entirely clear which node would generate the release of the SCG configuration part in such a case, but it could be beneficial if the MeNB would be able to do this One signalling option that has been identified would be for the MeNB to update fields in SCG-Configuration received from SeNB. In this option, SeNB would send the SCG configuration parameters (referred to as Information Element (IE) SCG-Configuration) in a container over X2 (e.g. in an octet string) to the MeNB. The IE SCG-Configuration includes parameters that are set by MeNB e.g. the SCC, fullConfigSCG. The SeNB does not set these parameters, or sets them to a dummy value. This parameter is in the original REL-12 part of the IE SCG-Configuration. This means, that any MeNB supporting Dual-Connectivity can set the parameter even if the SeNB would add extensions to the IE SCG-Configuration. The MeNB includes the received IE SCG-Configuration in a container (e.g. in an octet string) over the Uu interface towards the UE (i.e. in the RRCConnectionReconfiguration message). Use of this container makes it possible for MeNB to forward any extensions SeNB included, even if MeNB does not comprehend them. MeNB sets the SCG parameters in this SCG-Configuration that it decides e.g. the SCC, fullConfigSCG. The following ASN.1 specifies this approach.

```
-- ASN1START

RRCConnectionReconfiguration-v12xy-IEs ::= SEQUENCE (
    → scg-Configuration-r12→ → → → OCTET STRING (SCG-Configuration-r12)   *OPTIONAL, → -- Need ON
    → nonCriticalExtension → → → → SEQUENCE { } → → → → → →                OPTIONAL
)

SCG-Configuration-r12 ::= → → → CHOICE (
    → release → → → → → → → →              NULL
    → setup → → → → → → → → →               SEQUENCE (
        → → -- FFS how to indicate release and addition in single reconfiguration (i.e. change of SeNB)
        → → fullConfigSCG-r12→ → → → →           ENUMERATED (true)→ → →    OPTIONAL, -- Cond SCG-Cha
        → → securityConfigSCG-r12→ → → →         SecurityConfigSCG-r12→ →  OPTIONAL, -- Cond SCG-Est
        → → radioResourceConfigDedicatedSCG-r12→RadioResourceConfigDedicatedSCG-r12→OPTIONAL,-- Cond
SCG-Est
        → → -- FFS is there is a need for sCellToReleaseListSCG or whether this is done by MCG config
        → → sCellToReleaseListSCG-r12 → → →      SCellToReleaseList-r10→ → OPTIONAL, -- Need ON
        → → sCellToAddModListSCG-r12 → → →       SCellToAddModList-r10→ →  OPTIONAL, -- Cond SCG-Est
        → → -- FFS how to indicate UE shall apply RA in SCG and what to signal
        → → mobilityControlInfoSCG-r12→ → →      MobilityControlInfoSCG-r12→OPTIONAL,-- Cond SCG-Est
    → )
)

SecurityConfigSCG-r12 ::= → → → →             SEQUENCE {
    → scg-Count-r12 → → → → → →                INTEGER (0.. 65535),
    → cipheringAlgorithmSCG-r12 → → →          CipheringAlgorithm-r12,
    → ...
)
```

However, as, in this Uu signalling approach, the SeNB should treat some of the fields (e.g. fullConfigSCG and scg-Count) more or less as dummy fields, the MeNB cannot transparently forward the information received by SeNB, but needs to decode and re-code the information received from SeNB before signalling it to the UE.

An alternative approach would be that the MeNB forwards the SCG configuration parameters that it decides to sent to the UE consists of two parts i.e. a first part that is set by MeNB and a second part represented by field scg-ConfigurationPart2, containing the parameters set by SeNB.

In this approach, only the second part is carried in a container, and the MeNB can forward this part of the SCG configuration that is received from SeNB transparently to the UE. The following ASN.1 specifies this two-part signalling approach.

```
-- ASN1START

RRCConnectionReconfiguration-v12xy-IEs ::= SEQUENCE (
    scg-Configuration-r12         OCTET STRING (SCG-Configuration-r12)   *OPTIONAL, -- Need ON
    nonCriticalExtension          SEQUENCE { }                            OPTIONAL
)

SCG-Configuration-r12 ::= CHOICE (
    release                       NULL,
    setup                         SEQUENCE (
        scg-ConfigPart1-r12           SEQUENCE (
            fullConfigSCG-r12             ENUMERATED (true)                 OPTIONAL, -- Cond SCG-Cha
            securityConfigSCG-r12         SecurityConfigSCG-Part1-r12       OPTIONAL, -- Cond SCG-Est
            )i                                                              OPTIONAL, -- Need-ON,
        scg-ConfigPart2-r12           OCTET STRING (SCG-ConfigurationPart2-r12) OPTIONAL, -- Need ON
    )
)

SCG-ConfigurationPart2-r12 ::=    SEQUENCE (
    -- FFS how to indicate release and addition in single reconfiguration (i.e. change of SeNB)
    securityConfigSCG-r12         SecurityConfigSCG-Part2-r12 → OPTIONAL, -- Cond SCG-Est
    radioResourceConfigDedicatedSCG-r12→RadioResourceConfigDedicatedSCG-r12→OPTIONAL, -- Cond SCG-Est
    -- FFS is there is a need for sCellToReleaseListSCG or whether this is done by MCG config
    sCellToReleaseListSCG-r12     SCellToReleaseList-r10            OPTIONAL, -- Need ON
    sCellToAddModListSCG-r12      SCellToAddModList-r10             OPTIONAL, -- Cond SCG-Est
    -- FFS how to indicate UE shall apply RA in SCG and what to signal
    mobilityControlInfoSCG-r12→   MobilityControlInfoSCG-r12→       OPTIONAL→-- Cond SCG-Est
)

SecurityConfigSCG-Part1-r12 ::=   SEQUENCE (
    scg-Count-r12                 INTEGER (0.. 65535) ,
    ...
)

SecurityConfigSCG-Part2-r12 ::=   SEQUENCE (
    cipheringAlgorithmSCG-r12     CipheringAlgorithm-r12,
    ...
)
``` the SeNB, which subsequently includes them in the SCG-Configuration. The latter variant enable the MeNB to transparently forward the SCG configuration information received from SeNB.

In some cases it may be actually up to the SeNB to set fullConfigSCG i.e. when delta signalling would be supported upon SCG change. In such cases, the SeNB may actually decide, e.g. when on the received SCG configuration includes non-comprehended extensions, to apply full instead of delta signalling (i.e. for the same reasons as for the regular fullConfig).

In view of the above, an alternative signalling option is herein disclosed that enables simple transparent forwarding by the MeNB of the SCG configuration parameters received from the SeNB would be one where it can add additional IEs in the message to the UE. In this Uu signalling option, the SeNB sends the SCG configuration parameters (referred to as Information Element SCG-Configuration) in a container over X2 (e.g. in an octet string). The IE SCG-Configuration The ASN.1 above illustrates that with both Uu signalling approaches, all SCG configuration parameters are signalled together in a structure, which would make it easy to release all parameters in one go.

With both approaches, the use of containers enables the receiving node to forward the information received from originating eNB without having to comprehend the complete information (i.e. including all extensions introduced in later versions) generated by the originating node.

The first Uu signalling approach does however imply the MeNB needs to decode and re-code the information received from the SeNB which is a drawback. An advantage of second Uu signalling approach in which two parts are used is that it is possible to transparently forward the information received from the SeNB. Further, with the second approach the information sent to the UE is partitioned according to the network node that sets the information.

Thus to enable the E-UTRAN to configure the UE with DC in which the MeNB can efficiently transparently forward SCG configuration parameters received from the SeNB, the present application provides a method of a UE including receiving signalling of a DRB configuration including SCG configuration parameters provided together in a single information structure comprising two parts: a first part including SCG configuration parameters generated by the MeNB; and a second part including SCG configuration parameters generated by the SeNB. A container (such as an octet string) is provided around the parameters of the first and second parts or a container is provided around only the parameters of the second part.

The present application also provides a method of an eNB, acting as the MeNB, including transmitting signalling of a configuration of a DRB, the signalled DRB configuration including SCG configuration parameters provided together in a single information structure comprising two parts: a first part including SCG configuration parameters generated by the MeNB; and a second part including SCG configuration parameters generated by the SeNB. The two parts of the transmitted SCG configuration parameters are provided together in a single information structure. The MeNB sets the first part of the SCG configuration parameters and receives the second part of the SCG configuration parameters from the SeNB, and transmits to the UE the SCG configuration parameters provided in a single information structure comprising the two parts.

In one embodiment, a container is provided around the parameters of the first and second parts. Here, the MeNB transmits the first part of the SCG configuration parameters to the SeNB, and receives from the SeNB and transparently forwards to the UE the SCG configuration parameters provided in a single information structure comprising the two parts. Alternatively, the MeNB may decode the SCG configuration parameters of the second part and recode the SCG configuration parameters of the first and second parts, placing them together in a container before transmitting the SCG configuration parameters to the UE.

In another embodiment, a container is provided around only the parameters of the second part. In this embodiment, the MeNB receives the second part of the SCG configuration parameters from the SeNB, and transparently forwards them to the UE, placed within a container and which together with the first part of the SCG configuration parameters is provided in a single information structure comprising the two parts.

Additionally, the present application provides an eNB acting as an SeNB including transmitting configuration parameters, for use in signalling of a configuration of a DRB, the transmitted DRB configuration parameters comprising SCG configuration parameters generated by the SeNB. The DRB configuration parameters are transmitted to the MeNB over the X2 interface. The SeNB receives SCG configuration parameters generated by the MeNB and provides the transmitted DRB configuration parameters together in a single information structure comprising two parts: a first part including the SCG configuration parameters generated by the MeNB; and a second part including the SCG configuration parameters generated by the SeNB.

Another aspect of dual connectivity in which the present application provides a proposed alteration to UE behaviour is to avoid transfer delays on detection of Radio Link Failure (RFL) or release of an SCG DRB, as will be explained below.

When detecting RLF of an SCG (SCG SCG-RLF), data communication via the SCG is impossible as the UE suspends uplink transmission via the SCG. The UE furthermore reports the problem to the MeNB. Currently, until the MeNB has resolved the issue, packets transferred via DRBs for which data is (partially) transferred via the SCG will thus suffer from increased transfer delay. To avoid this, upon detecting SCG-RLF or SCG release, the UE initiates autonomous reconfiguration of the DRBs which data is (partially) transferred via the SCG. For example, upon detecting SCG-RLF, the UE autonomously reconfigures the one or more split DRB to MCG DRB by releasing the associated SCG-RLC entity and associated the SCG logical channel. In another example, upon detecting SCG-RLF, the UE autonomously reconfigures one or more SCG DRB to MCG DRB by releasing the associated SCG-RLC entity and the associated SCG logical channel while establishing a new MCG entities with a default configuration. The associated PDCP is re-established (alike upon handover) and reconfigured to a default configuration. The default configuration could either be a configuration specified in the standard, or the configuration that was used in the SCG, or the configuration last used in the MCG for the same EPS bearer (i.e. before it was changed to SCG DRB).

On the other hand, the default configuration could be different for different protocol parts (PDCP, RLC, Logical channel).

For example, Table 4 below shows an illustration that for different protocol parts a different default could be used.

TABLE 4

Example default configuration per protocol part on autonomous reconfiguration

| Protocol part | New baseline configuration of MCG DRB that was SCG DRB (when autonomously reconfigured) | New baseline configuration of MCG DRB that was split DRB (when autonomously reconfigured) |
| --- | --- | --- |
| PDCP config | PDCP config used in SCG | |
| RLC config | RLC config used in SCG | |
| LogicalChannel identity | Logical channel identity used in MCG before it was changed to SCG DRB (for the same EPS bearer) | |
| Logical channel config | Logical channel config used in MCG before it was changed to SCG DRB (for the same EPS bearer) | |

To use the configuration used in the SCG as default, the MeNB needs to know the current SCG configuration. As the SeNB always signals this via MeNB, the MeNB should always have the latest SCG-Configuration. It could however be that the SeNB configures extensions not comprehended by the MeNB. If this is the case, the MeNB can either decide to use another default e.g. the default specified in the standard or it could indicate that the UE should release all extension beyond a particular protocol release. As the objective of the autonomous UE actions is to avoid increased transfer delays, this should be configured prior to SCG-RLF being detected (i.e. if it were in a message by which the MeNB indicates the UE is allowed to resume data transfer across the former SCG DRBs, the main objective would be defeated). Thus the MeNB should indicate which default configuration the UE shall apply, which is done in advance of the SCG-RLF or SCG release. When the MeNB indicates that the configuration used in the SCG is the default, it may additionally indicate that, when applying this default, the UE shall release all extensions beyond a particular protocol release, if configured.

In case E-UTRAN releases the SCG, the UE could perform the same autonomous reconfiguration operations as defined for detection of SCG-RLF. This would mean the network would only need to configure any changes compared to the (default) configurations resulting from the UE autonomous reconfigurations. This may reduce the signaling upon SCG release as the MeNB may just signal the new configuration when releasing the SCG.

It will be appreciated that embodiments of the present invention can be realized in the form of hardware, software or a combination of hardware and software. Any such software may be stored in the form of volatile or non-volatile storage, for example, a storage device like a ROM, whether erasable or rewritable or not, or in the form of memory, for example, RAM, memory chips, device or integrated circuits or on an optically or magnetically readable medium, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium including a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method performed by a master base station in a wireless communication system supporting dual connectivity, the method comprising:
   transmitting, to a target secondary base station, an addition request message for secondary base station change, the addition request message including a current secondary cell group (SCG) configuration associated with a terminal;
   receiving, from the target secondary base station, an acknowledge message as a response to the addition request message for the secondary base station change, wherein the acknowledge message includes a new SCG configuration associated with the terminal and information indicating that the terminal releases the current SCG configuration and applies the new SCG configuration;
   transmitting, to the terminal, a radio resource control (RRC) reconfiguration message including the new SCG configuration associated with the terminal;
   receiving, from the terminal, an RRC reconfiguration complete message as a response to the RRC reconfiguration message; and
   transmitting, to the target secondary base station, a secondary base station reconfiguration complete message as a response to the RRC reconfiguration complete message.

2. The method of claim 1, wherein the information is included in the acknowledge message, in case that the current SCG configuration is unable to be comprehended.

3. A method performed by a target secondary base station in a wireless communication system supporting dual connectivity, the method comprising:
   receiving, from a master base station, an addition request message for a secondary base station change, the addition request message including a current secondary cell group (SCG) configuration associated with a terminal;
   determining whether the terminal releases the current SCG configuration and applies a new SCG configuration associated with the terminal;
   transmitting, to the master base station, an acknowledge message as a response to the addition request message for the secondary base station change; and
   receiving, from the master base station, a secondary base station reconfiguration complete message for completion of a reconfiguration associated with the target secondary base station,
   wherein the acknowledge message includes the new SCG configuration and information indicating that the terminal releases the current SCG configuration and applies the new SCG configuration based on the determination.

4. The method of claim 3, wherein the information is included in the acknowledge message in case that the current SCG configuration is unable to be comprehended.

5. A master base station in a wireless communication system supporting dual connectivity, the master base station comprising:
  a transceiver; and
  a processor coupled with the transceiver and configured to:
  transmit, to a target secondary base station, an addition request message for secondary base station change, the addition request message including a current secondary cell group (SCG) configuration associated with a terminal,
  receive, from the target secondary base station, an acknowledge message as a response to the addition request message for the secondary base station change, wherein the acknowledge message includes a new SCG configuration associated with the terminal and information indicating that the terminal releases the current SCG configuration and applies the new SCG configuration,
  transmit, to the terminal, a radio resource control (RRC) reconfiguration message including the new SCG configuration associated with the terminal,
  receive, from the terminal, an RRC reconfiguration complete message as a response to the RRC reconfiguration message, and
  transmit, to the target secondary base station, a secondary base station reconfiguration complete message as a response to the RRC reconfiguration complete message.

6. The master base station of claim 5, wherein the information is included in the acknowledge message, in case that the current SCG configuration is unable to be comprehended.

7. A target secondary base station in a wireless communication system supporting dual connectivity, the target secondary base station comprising:
  a transceiver; and
  a processor coupled with the transceiver and configured to:
  receive, from a master base station, an addition request message for a secondary base station change, the addition request message including a current secondary cell group (SCG) configuration associated with a terminal,
  determine whether the terminal releases the current SCG configuration and applies a new SCG configuration associated with the terminal,
  transmit, to the master base station, an acknowledge message as a response to the addition request message for the secondary base station change, and
  receive, from the master base station, a secondary base station reconfiguration complete message for completion of a reconfiguration associated with the target secondary base station,
  wherein the acknowledge message includes the new SCG configuration and information indicating that the terminal releases the current SCG configuration and applies the new SCG configuration based on the determination.

8. The target secondary base station of claim 7, wherein the information is included in the acknowledge message in case that the current SCG configuration is unable to be comprehended.

* * * * *